United States Patent
Taniguchi

(10) Patent No.: US 9,571,988 B2
(45) Date of Patent: Feb. 14, 2017

(54) LOCATION BASED ASSISTING APPARATUSES, METHODS AND COMPUTER READABLE MEDIUMS

(71) Applicant: LINE Corporation, Tokyo (JP)

(72) Inventor: Tomohiko Taniguchi, Tokyo (JP)

(73) Assignee: Line Corporation, Tokyo (JP)

( * ) Notice: Subject to any disclaimer, the term of this patent is extended or adjusted under 35 U.S.C. 154(b) by 0 days.

(21) Appl. No.: 14/837,408

(22) Filed: Aug. 27, 2015

(65) Prior Publication Data

US 2016/0249181 A1     Aug. 25, 2016

(30) Foreign Application Priority Data

Feb. 23, 2015    (JP) ................ 2015-033144

(51) Int. Cl.
     *H04W 4/04*      (2009.01)
     *H04W 4/02*      (2009.01)

(52) U.S. Cl.
     CPC ............. *H04W 4/046* (2013.01); *H04W 4/028* (2013.01)

(58) Field of Classification Search
     CPC .............................. H04W 4/046; H04W 4/028
     See application file for complete search history.

(56) References Cited

U.S. PATENT DOCUMENTS

| | | | |
|---|---|---|---|
| 9,139,091 B1 * | 9/2015 | Penilla ................. | B60S 5/06 |
| 9,157,748 B2 * | 10/2015 | Millspaugh ............ | G01C 21/20 |
| 9,232,350 B2 * | 1/2016 | Foy ......................... | H04W 4/02 |
| 2003/0100993 A1 * | 5/2003 | Kirshenbaum ........ | G01C 21/26 |
| | | | 701/408 |
| 2004/0158483 A1 * | 8/2004 | Lecouturier ........... | G06Q 10/08 |
| | | | 705/6 |
| 2008/0195428 A1 * | 8/2008 | O'Sullivan ............ | G06Q 10/00 |
| | | | 705/6 |
| 2008/0270204 A1 * | 10/2008 | Poykko ................... | G06Q 10/04 |
| | | | 705/7.29 |
| 2013/0060586 A1 * | 3/2013 | Chen ...................... | G06Q 10/06 |
| | | | 705/5 |

(Continued)

FOREIGN PATENT DOCUMENTS

| | | |
|---|---|---|
| JP | 2003196792 A | 7/2003 |
| JP | 2005107942 A | 4/2005 |

(Continued)

OTHER PUBLICATIONS

Office Action for Korean Application No. 10-2016-0019023 dated Dec. 15, 2016.

*Primary Examiner* — Kenneth Lam

(74) *Attorney, Agent, or Firm* — Harness, Dickey & Pierce

(57) ABSTRACT

An apparatus includes at least one processor and a transceiver. The at least one processor is configured to execute computer readable instructions to: acquire first location information representing locations of a plurality of user terminals, second location information representing a location of at least one vehicle, and third location information representing a location of a destination of the plurality of user terminals; and determine a route from the location of the at least one vehicle to the location of the destination based on the first location information, the second location information and the third location information, wherein the route includes the location of each of the plurality of user terminals. The transceiver is configured to transmit the route to the plurality of user terminals.

7 Claims, 26 Drawing Sheets

(56) References Cited

U.S. PATENT DOCUMENTS

| | | | | |
|---|---|---|---|---|
| 2013/0073327 | A1* | 3/2013 | Edelberg | G06Q 10/0631 705/7.13 |
| 2013/0288716 | A1* | 10/2013 | Kwon | H04W 4/046 455/456.3 |
| 2014/0343845 | A1* | 11/2014 | Choi | G01C 21/3438 701/522 |
| 2015/0348408 | A1* | 12/2015 | Demisse | G08G 1/017 340/933 |
| 2016/0069694 | A1* | 3/2016 | Tao | G01C 21/34 701/410 |

FOREIGN PATENT DOCUMENTS

| | | |
|---|---|---|
| JP | 2009289192 A | 12/2009 |
| KR | 20130082834 A | 7/2013 |

* cited by examiner

REGISTER NECESSARY INFORMATION

| Family name | TANIGUCHI |
| Given name | TOMOHIKO |
| TEL | 090-1234-5678 |

Terms of use of line    Terms of use of line taxi

Agree to terms and subscribe

FIG. 14
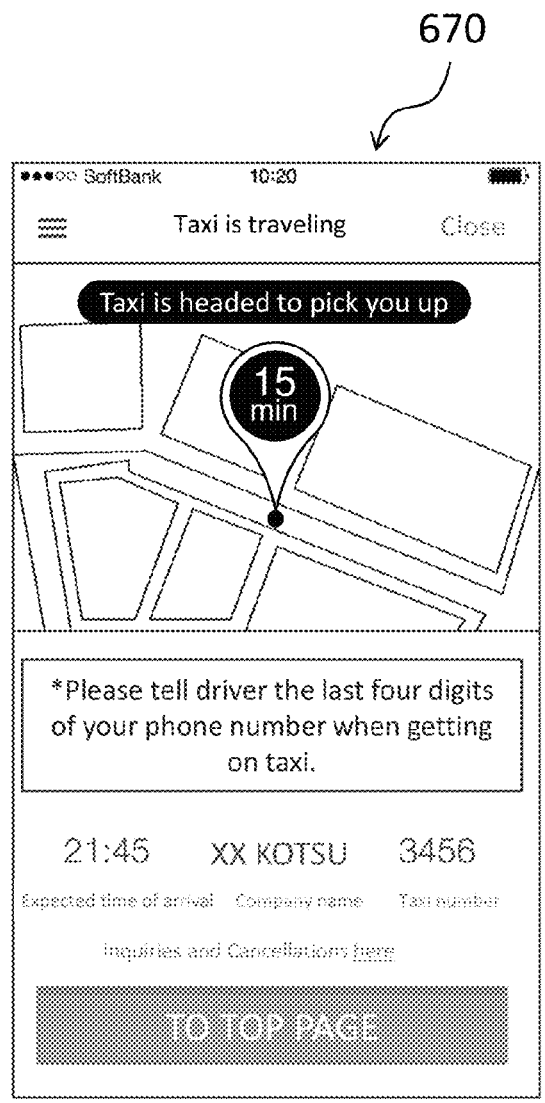
670
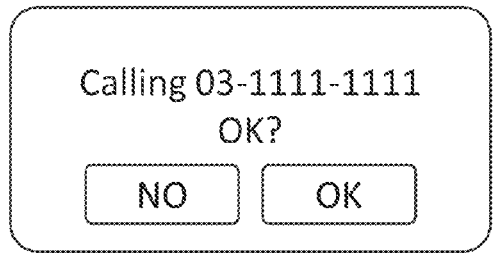

FIG. 20

| VEHICLE | USER | DISTANCE TO USER | TRAVEL DISTANCE | EXPECTED TIME OF ARRIVAL |
|---|---|---|---|---|
| 300B | 200B | 200m | 4.0km | 17:20 |
| 300C | 200C | 250m | 3.5km | 17:00 |
| 300A | 200A | 400m | 2.5km | 17:10 * |
| ... | ... | | | |

600
601 602 603 604 605

*THERE IS TRAFFIC CONGESTION

LOCATION BASED ASSISTING APPARATUSES, METHODS AND COMPUTER READABLE MEDIUMS

CROSS-REFERENCE TO RELATED APPLICATION(S)

This application claims priority under 35 U.S.C. §119 to Japanese Patent Application No. 2015-033144, filed on Feb. 23, 2015, in the Japanese Patent Office, the entire contents of which are incorporated herein by reference.

BACKGROUND

Field

One or more example embodiments relate to location based assisting apparatuses, methods and/or computer readable mediums.

Description of Related Art

In many cases, people utilize pay vehicles such as taxies and limousine as a mode of transportation. Transportation using pay vehicles is very convenient because it can provide service according to the needs of each user. However, fares of pay vehicles are higher than that of public transportation such as trains and buses.

If a pay vehicle such as a taxi or a limousine hire is shared by more than one user (sometimes referred to as vehicle sharing), the fare per user can be reduced. Particularly, if a plurality of users travel to the same destination, there is relatively high demand for sharing the pay vehicle.

In one related art method for sharing pay vehicles, a vehicle dispatch center recognizes a location where a user desires to obtain on a vehicle and a destination of each of a plurality of users, judges whether or not a vehicle can be shared by extracting users whose locations where they desire to get on the vehicle and whose destinations are the same or who are located within a threshold range, and extracts and dispatches a pay vehicle optimal for sharing only when it is judged that the vehicle can be shared.

However, in this example, if there is no other user whose location where he desires to get in a vehicle and whose destination are the same as those of the user, it is impossible to share a pay vehicle. Further, for example, when a user and a friend of the user whose location where he desires to get in a vehicle is different from that of the user desire to share a pay vehicle to travel to the same destination, the user himself needs to determine a route to share the pay vehicle. However, because each user does not know who is located closest to a pay vehicle, it is difficult to select a pay vehicle and an optimal route while reflecting requests of the users most when the users travel while sharing the pay vehicle.

SUMMARY

One or more example embodiments relate to apparatuses, methods and/or computer readable mediums capable of assisting a plurality of users to share a pay vehicle such as a taxi.

At least some example embodiments provide vehicle sharing assisting apparatuses capable of assisting a plurality of users to share a vehicle, such as a pay vehicle, and which provides a vehicle suitable to be shared and a route from the vehicle to a destination. Example embodiments also provide methods and non-transitory computer readable mediums storing computer programs for assisting vehicle sharing.

At least one example embodiment provides a vehicle sharing assisting apparatus including: a location information acquiring unit configured to acquire a plurality of pieces of first location information representing locations of a plurality of user terminals, second location information representing a location of at least one vehicle, and third location information representing a location of a destination of the plurality of user terminals; a route acquiring unit configured to acquire a route for reaching the third location information from the second location information by way of the plurality of pieces of first location information based on the first location information, the second location information and the third location information; and a transmitting unit configured to transmit the route acquired by the route acquiring unit to the plurality of user terminals.

According to at least some example embodiments, the plurality of user terminals may build social relationships in a service subscribed to by the plurality of user terminals.

The route acquiring unit may be configured to acquire a route first passing through a piece of the first location information, which is relatively far from the third location information among the plurality of pieces of first location information.

The route acquiring unit may be configured to acquire a route first passing through a piece of the first location information, which is relatively close to the second location information among the plurality of pieces of first location information.

The vehicle sharing assisting apparatus may further include a list display unit configured to display a list of routes, and the location information acquiring unit may acquire at least one piece of second location information, the route acquiring unit may be configured to acquire a route for each of the at least one piece of second location information, and the list display unit may be configured to display a list of at least one route acquired for each of the at least one piece of second location information.

The list display unit may be configured to display a list of routes listed based on travel distances of at least one route.

The transmitting unit may be configured to transmit information indicating that a user terminal has gotten on or out of a vehicle to the plurality of user terminals.

When a distance between a vehicle and a user terminal becomes equal to or less than a threshold distance, the transmitting unit may transmit information indicating that the vehicle is approaching the user terminal to at least one user terminal among the plurality of user terminals.

The vehicle sharing assisting apparatus may further include a getting on/out judging unit configured to judge whether a user terminal has gotten on a vehicle when a distance between the first location information and the second location information is equal to or less than a threshold distance.

The getting on/out judging unit may be configured to judge that the user terminal has gotten on the vehicle when the first location information and the second location information move in the same or substantially the same direction.

The getting on/out judging unit may be configured to judge that the user terminal has gotten out of the vehicle when the distance between the first location information and the second location information becomes greater than a threshold distance.

The getting on/out judging unit may be configured to judge that the user terminal has gotten out of the vehicle when the second location information moves in a different direction from the first location information.

Each user terminal and/or the vehicle may include a near field communication unit generating a signal when a distance between the user terminal and the vehicle becomes equal to or less than a threshold distance, and the getting on/out judging unit may be configured to judge that the user terminal has gotten on the vehicle or the user terminal has gotten out of the vehicle based on the signal.

At least one other example embodiment provides a non-transitory computer readable medium storing computer readable instructions that, when executed by at least one processor, cause a computer device to perform a method comprising: acquiring a plurality of pieces of first location information representing locations of a plurality of user terminals, second location information representing a location of at least one vehicle, and third location information representing a location of a destination of the plurality of user terminals; acquiring a route for reaching the third location information from the second location information by way of the plurality of pieces of first location information based on the first location information, the second location information and the third location information; and transmitting the route acquired by the route acquiring unit to the plurality of user terminals.

One or more example embodiments provide vehicle sharing assisting apparatus capable of assisting a plurality of users to share a vehicle, such as a pay vehicle, and provide a vehicle suitable to be shared, and a route from the vehicle to a destination. Example embodiments also provide non-transitory computer readable mediums and methods for assisting vehicle sharing.

At least one other example embodiment provides an apparatus comprising: at least one processor and a transceiver. The at least one processor is configured to execute computer readable instructions to: acquire first location information, second location information, and third location information, the first location information representing locations of a plurality of user terminals, the second location information representing a location of at least one vehicle, and the third location information representing a location of a destination of the plurality of user terminals; and determine a route from the location of the at least one vehicle to the location of the destination based on the first location information, the second location information and the third location information, the route including the locations of the plurality of user terminals. The transceiver is configured to transmit the route to the plurality of user terminals.

At least one other example embodiment provides a non-transitory computer readable medium storing computer readable instructions that, when executed by at least one processor, cause a computer to perform a method comprising: acquiring first location information, second location information, and third location information, the first location information representing locations of a plurality of user terminals, the second location information representing a location of at least one vehicle, and the third location information representing a location of a destination of the plurality of user terminals; determining a route from the location of the at least one vehicle to the location of the destination based on the first location information, the second location information and the third location information, the route including the locations of the plurality of user terminals; and transmitting the route to the plurality of user terminals.

At least one other example embodiment provides a method comprising: acquiring first location information, second location information, and third location information, the first location information representing locations of a plurality of user terminals, the second location information representing a location of at least one vehicle, and the third location information representing a location of a destination of the plurality of user terminals; determining a route from the location of the at least one vehicle to the location of the destination based on the first location information, the second location information and the third location information, the route including the locations of the plurality of user terminals; and transmitting the route to the plurality of user terminals.

According to at least some example embodiments, the plurality of user terminals may be associated with one another through one or more social relationships created through a service subscribed to by the plurality of user terminals.

The route may first pass through a location of a first of the plurality of user terminals that is further from the location of the destination relative to others of the plurality of user terminals.

The route may first pass through a location of a first of the plurality of user terminals that is closer to the location of the at least one vehicle relative to others of the plurality of user terminals.

The at least one processor may be further configured to execute the computer readable instructions to: acquire at least one portion of the second location information; and determine a portion of the route for each of the at least one portion of the second location information. The apparatus may further include a list display unit configured to display a list of instructions for each determined portion of the route.

The list display unit may be further configured to display a list of instructions for the route based on a travel distance for the route.

The transceiver may be further configured to transmit information indicating that a first of the plurality of user terminals has entered or exited the at least one vehicle to at least a second of the plurality of user terminals.

The transceiver may be further configured to transmit information indicating that the at least one vehicle is approaching a first of the plurality of user terminals when a distance between the location of the at least one vehicle and a location of the first of the plurality of user terminals is less than or equal to a first threshold distance.

The at least one processor may be further configured to execute the computer readable instructions to determine that the first of the plurality of user terminals has entered the at least one vehicle when a distance between the location of the first of the plurality of user terminals and the location of the at least one vehicle is less than or equal to a second threshold distance.

The at least one processor may be further configured to execute the computer readable instructions to determine that the first of the plurality of user terminals has entered the at least one vehicle when the location of the first of the plurality of user terminals and the location of the at least one vehicle move in the same direction.

The at least one processor may be further configured to execute the computer readable instructions to determine that the first of the plurality of user terminals has exited the vehicle when the distance between the location of the first of the plurality of user terminals and the location of the at least one vehicle exceeds the second threshold distance.

The at least one processor may be further configured to execute the computer readable instructions to determine that the first of the plurality of user terminals has exited the at least one vehicle when the location of the at least one vehicle and the location of the first of the plurality of user terminals indicates that the at least one vehicle is moving in a different direction relative to the first of the plurality of user terminals.

At least one of the first of the plurality of user terminals and the at least one vehicle may include a near field communication transceiver, the near field communication transceiver being configured to generate a signal when a distance between the first of the plurality of user terminals and the at least one vehicle is less than or equal to the second threshold distance. The at least one processor may be further configured to execute the computer readable instructions to determine that the first of the plurality of user terminals has entered or exited the at least one vehicle based on the signal.

BRIEF DESCRIPTION OF THE DRAWINGS

FIG. 10 is a diagram illustrating one example of an interface for user registration in the operation flow of the vehicle sharing assisting apparatus according to an example embodiment;

FIG. 14 is a diagram illustrating an example of screen display while a vehicle is headed to pick up a user in the operation flow of the vehicle sharing assisting apparatus according to an example embodiment;

FIG. 20 is a diagram illustrating one example of a list displayed by a list display unit of the assisting server used in the vehicle sharing assisting apparatus according to an example embodiment;

DETAILED DESCRIPTION

Figure 1:
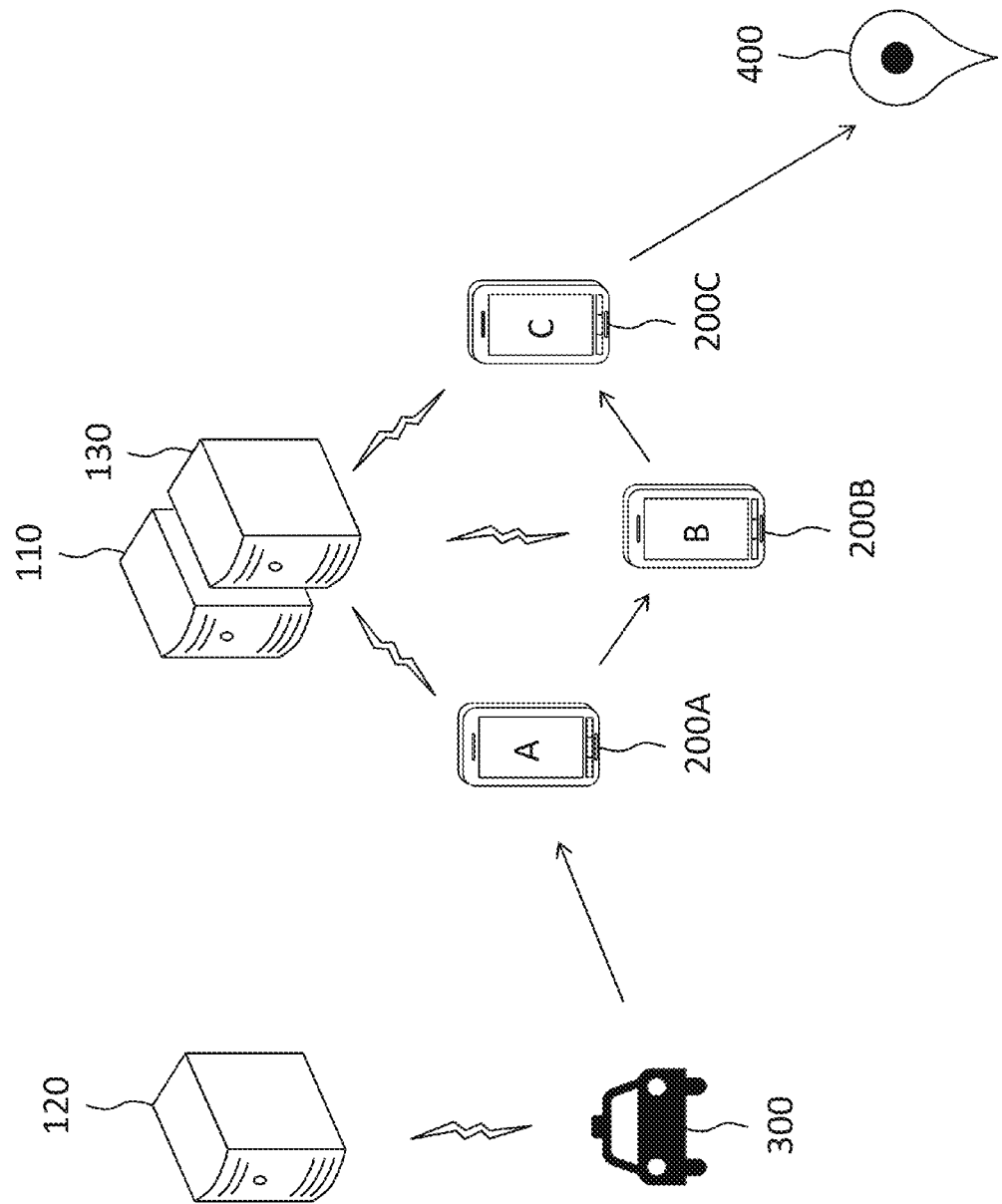
FIG. 1 is a diagram illustrating an overview of a vehicle sharing assisting apparatus according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, some example embodiments are described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Example embodiments will be described in detail with reference to the accompanying drawings. Example embodiments, however, may be embodied in various different forms, and should not be construed as being limited only to the illustrated example embodiments. Rather, these embodiments are provided as examples so that this disclosure will be thorough and complete, and will fully convey example embodiments to those skilled in the art. Accordingly, known processes, elements, and techniques are not described with respect to some of the example embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of this disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure is illustrated in a cross-sectional view, an electronic device may include a plurality of the device structures, as would be illustrated by a plan view of the electronic device. The plurality of device structures may be arranged in an array and/or in a two-dimensional pattern.

It will be apparent to those skilled in the art that various modifications and variations can be made to the example embodiments without departing from the spirit or scope of example embodiments described herein. Thus, it is intended that the example embodiments cover the modifications and variations of the example embodiments provided they come within the scope of the appended claims and their equivalents.

Hereinafter, example embodiments will be described in detail with reference to the accompanying drawings. In this regard, the same or corresponding elements will be denoted by the same reference numerals and will not be redundantly described herein.

Example embodiments disclosed herein may include program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits (or circuitry) and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

Example embodiments of vehicle sharing assisting apparatuses, methods, and non-transitory computer readable mediums, for assisting vehicle sharing will be described in more detail below with reference to the drawings. Note that the example embodiments can be implemented in a number of different aspects, and are not limited to the embodiments discussed herein. It should be noted that, in the drawings referred to in the embodiments, the same reference numerals are assigned to the same portions or portions having the same functions, and overlapped explanation will be omitted.

In the following description, while a user utilizes a pay vehicle, because the user travels with a user terminal, the user is not clearly differentiated from the user terminal. For example, when a user utilizes a pay vehicle, because the user having a user terminal utilizes the pay vehicle, there is a case where such situation is expressed as "the user terminal utilizes the pay vehicle". This is synonymous with "the user having the user terminal utilizes the pay vehicle". In a similar manner, a case where a user utilizes vehicle arrangement service is expressed as a user terminal utilizes the service.

While, in one or more example embodiments, a vehicle sharing fare calculating system in a vehicle such as a taxi and a limousine hire, whose fare fluctuates according to one or both of a travel distance and a travel period, is described as an example, the vehicle is not limited to this. For example, one or more example embodiments may be applied to transportation such as ships, airplanes, helicopters, etc.

A vehicle sharing assisting apparatus, method and non-transitory computer readable medium, according to an example embodiment will be described in detail with reference to FIG. 1 to FIG. 16.

Figure 2:
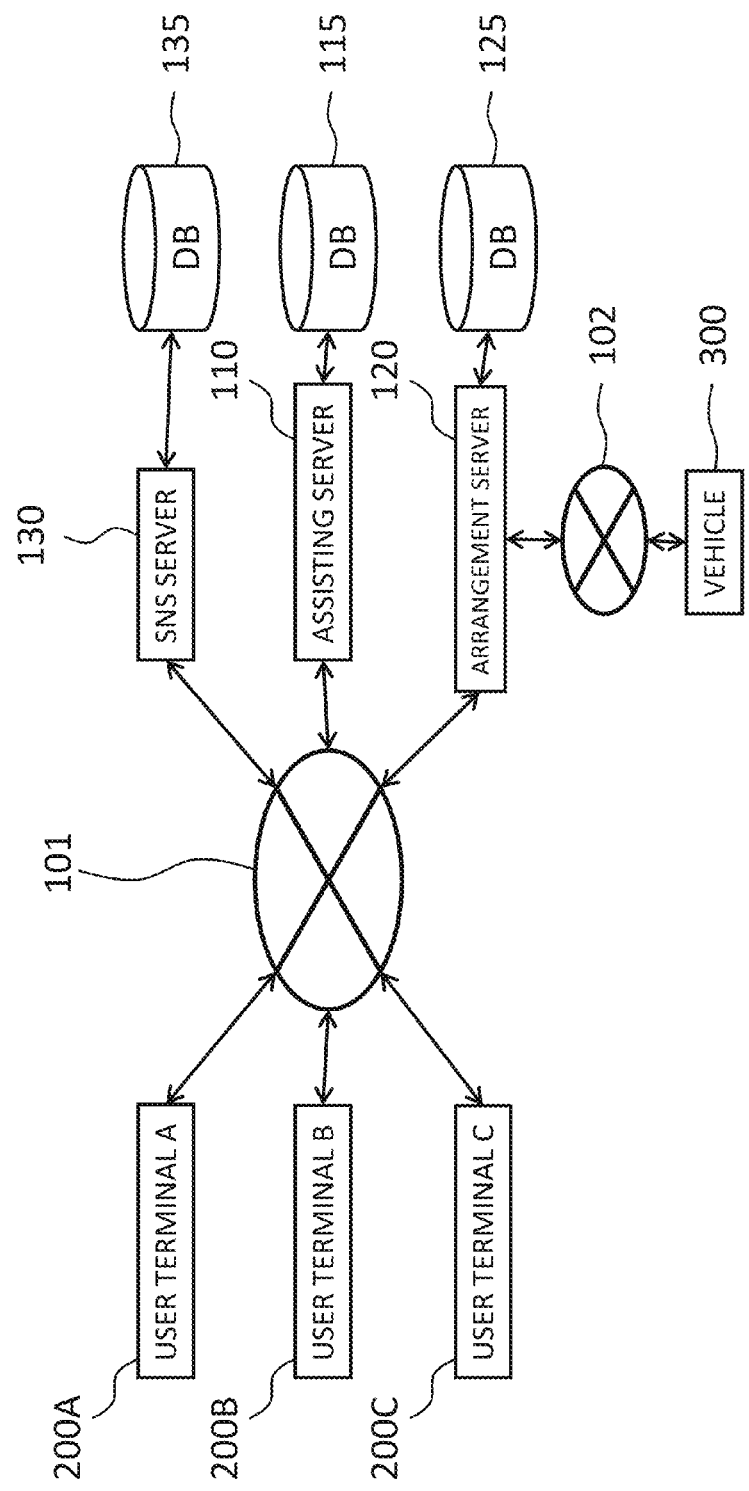
FIG. 2 is a block diagram illustrating an overview of the vehicle sharing assisting apparatus according to an example embodiment.

FIG. 1 is a diagram illustrating an overview of a vehicle sharing assisting apparatus according to an example embodiment. FIG. 2 is a block diagram illustrating an overview of the vehicle sharing assisting apparatus according to an example embodiment. As illustrated in FIG. 1 and FIG. 2, a vehicle sharing assisting apparatus 10 according to at least this example embodiment includes an assisting server 110, an arrangement server 120 and a social networking service (SNS) server 130 (hereinafter, simply referred to as an "SNS server 130"). As illustrated in FIG. 1, the assisting server 110 and the SNS server 130 communicate with a plurality of user terminals 200, while the arrangement server 120 communicates with a vehicle 300.

When a user terminal 200A of a user A, a user terminal 200B of a user B and a user terminal 200C of a user C are not particularly distinguished, the user terminal will be referred to as a user terminal 200. Further, the plurality of user terminals 200 may be any communication terminal, which can be connected to at least a first network 101 illustrated in FIG. 2, and the respective user terminals 200 may have functions different from each other. As the user terminal 200, a mobile phone, a smartphone, a tablet PC, a PDA, a personal computer, a PHS, a wearable terminal, or the like, may be employed.

The assisting server 110 searches a route and a vehicle 300 suitable for vehicle sharing or acquires the searched route and vehicle 300 from first location information of the plurality of user terminals 200 of a plurality of users, second location information of the vehicle 300 and third location information of a destination 400 for the plurality of users who desire to share the vehicle 300, and provides the route and the vehicle 300 to the user terminals 200. The arrangement server 120, which is a server of an arrangement center that accepts an arrangement request and issues an arrangement instruction to the vehicle 300, manages the second location information of the vehicle 300. The SNS server 130, which is a server providing SNS service to the user terminals 200, manages user terminal specific information of the plurality of user terminals 200 that subscribe to the SNS service, user personal information, or the like. While, according to at least this example embodiment, a configuration is described where the assisting server 110 and the SNS server 130 are separately provided, the configuration is not limited to this example. For example, the assisting server 110 may have a function of the SNS server 130. That is, for example, functions of the assisting server 110 and functions of the SNS server 130 may be implemented at a single server.

As illustrated in FIG. 1, the vehicle sharing assisting apparatus 10 acquires the first location information of the plurality of user terminals 200, the second location information of the vehicle 300, and the third location information of the destination 400 of the plurality of user terminals 200 and the vehicle 300, acquires a route for reaching the destination 400 from the vehicle 300 by way of the plurality of user terminals 200 based on the respective location information of the plurality of user terminals 200, the vehicle 300 and the destination 400, and transmits the acquired route to the plurality of user terminals 200. Here, the locations of the user terminals 200 on the above-described route are not limited to locations of the respective user terminals 200 at the time when the route is acquired, but can be set at arbitrary points designated by the respective user terminals 200.

Here, the plurality of user terminals 200 and the vehicle 300 are able to specify location. The user terminals 200 may specify locations using, for example, a GPS (Global Positioning System). In the vehicle sharing assisting apparatus 10, the first location information of the plurality of user terminals 200 is transmitted to the assisting server 110, while the second location information of the vehicle 300 is transmitted to the arrangement server 120. Further, the third location information of the destination 400, which is information input by the plurality of user terminals 200, is transmitted to the assisting server 110 from the user terminals 200 that has input the third location information.

Here, the respective users of the plurality of user terminals 200 may be users referred to as "fellows", "friends", or the like, in the SNS service managed by the SNS server 130, who build social relationships with each other and who can get in touch with each other. In other words, the plurality of user terminals 200 build social relationships with each other, which allow the users to get in touch with each other by at least one of the users being registered to build social relationships in a given (or, alternatively, desired or predetermined) service subscribed to by the plurality of user terminals 200. While a configuration has been described here where the plurality of user terminals 200 build social relationships with each other, the configuration is not limited to this example. That is, for example, the plurality of user terminals 200 do not have to build social relationships as described above. In this case, in FIG. 1, the SNS server 130 may be omitted.

The respective users of the plurality of user terminals 200 may be users who build social relationships of "friends" with each other in the SNS service managed by the SNS server 130. In other words, for example, the plurality of user terminals 200 build social relationships approved by each other in a given (or, alternatively, desired or predetermined) service subscribed to by the plurality of user terminals 200. The social relationships approved by each other not only indicate that the users recognize each other, but also indicate, for example, social relationships built by one user transmitting a request for building social relationships of friends to the other user and the other user approving the request. While a configuration has been described here where the plurality of user terminals 200 build social relationships approved by each other, the configuration is not limited to this example. That is, for example, the plurality of user terminals 200 may not build the social relationships as described above. In this case, in FIG. 1, the SNS server 130 may be omitted.

As illustrated in FIG. 2, the assisting server 110, the arrangement server 120, the SNS server 130 and the plurality of user terminals 200 are connected to each other via the first network 101. The arrangement server 120 and the vehicle 300 are connected to each other via a second network 102. The assisting server 110, the arrangement server 120 and the SNS server 130 have respective databases (DBs) 115, 125 and 135. As the first network 101, a typical Internet Protocol (IP) network can be applied, however, example embodiments are not limited to this example. As the second network 102, radio communication for taxies or a local network can be applied, however, example embodiments are not limited to this example.

Although FIG. 2 illustrates a configuration where the arrangement server 120 and the vehicle 300 are connected via the second network 102, the configuration is not limited to this example. For example, the vehicle 300 may be connected to the arrangement server 120 via the first network 101. Further, although FIG. 2 illustrates a configuration where the assisting server 110, the arrangement server 120 and the SNS server 130 are directly connected to the respective databases 115, 125 and 135, the configuration is not limited to this example. Rather, for example, the databases 115, 125 and 135 may be connected to the first network 101. That is, for example, it is possible to utilize cloud computing in which data is stored via a network, in place of the databases 115, 125 and 135.

In the database 115 connected to the assisting server 110, equipment specific information of the respective user terminals 200, personal information (such as name, a phone number, credit card information, email address, address, age and sex) of users of the user terminals, user IDs (Identifiers) in the service, evaluation information of the users of the user terminals 200 and the vehicle 300, road map information, traffic congestion information, or the like, are stored. Here, the above-described equipment specific information of the user terminals 200 and the personal information of the users are stored in association with each other.

In the database 125 connected to the arrangement server 120, a type of vehicle, a vehicle number, driver information (e.g., name, a mobile phone number, age, sex, etc.), an actual state (e.g., vacant, not in service, reserved and in service) of the vehicle 300, the second location information of the vehicle 300, or the like, are stored.

In the database 135 connected to the SNS server 130, user IDs of the users who utilize the SNS service provided by the SNS server 130, equipment specific information of the user terminals of the users, a list of other users (a list of friends) who build social relationships with the users, or the like, are stored. Further, when the SNS server 130 has a payment system in the SNS service, information registered in the payment system such as credit card information may be further stored in the database 135.

Figure 3:
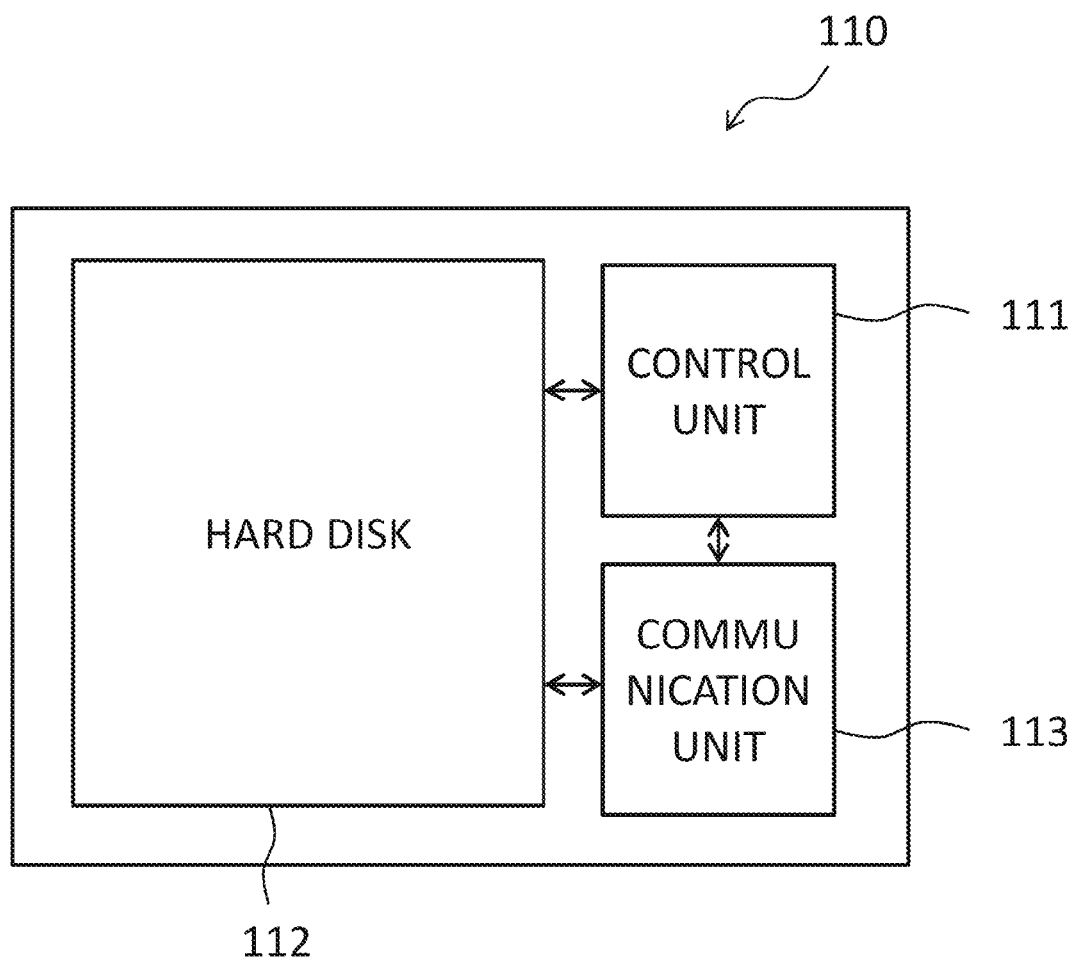
FIG. 3 is a block diagram illustrating a hardware structure of an assisting server used in the vehicle sharing assisting apparatus according to an example embodiment.

FIG. 3 is a block diagram illustrating a hardware structure of the assisting server used in the vehicle sharing assisting apparatus according to example embodiment. According to FIG. 3, the assisting server 110 includes a control unit 111, a hard disk 112 and a communication unit 113.

The control unit 111 includes a central processing unit (CPU) and a storage device such as a register and a memory. The control unit 111 executes computer readable instructions and/or programs stored in the memory using the CPU to perform arithmetic processing according to instruction signals from the user terminals 200.

The hard disk 112, which is a storage device that can store a large volume of data, stores computer readable instructions, programs or the like, necessary for the arithmetic processing, and temporarily stores information transmitted from the user terminals 200.

The communication unit 113 controls data transmission and reception among the arrangement server 120, the SNS server 130 and the user terminals 200 via the first network 101. The communication unit 113 may include one or more interfaces, antennas, and corresponding circuitry, for transmitting/receiving data over a wired and/or wireless connection. The communication unit 113 may also be referred to as a transceiver. Here, a storage device of the control unit 111 reads out and stores computer readable instructions and/or programs necessary for the arithmetic processing from the hard disk as necessary.

Figure 4:
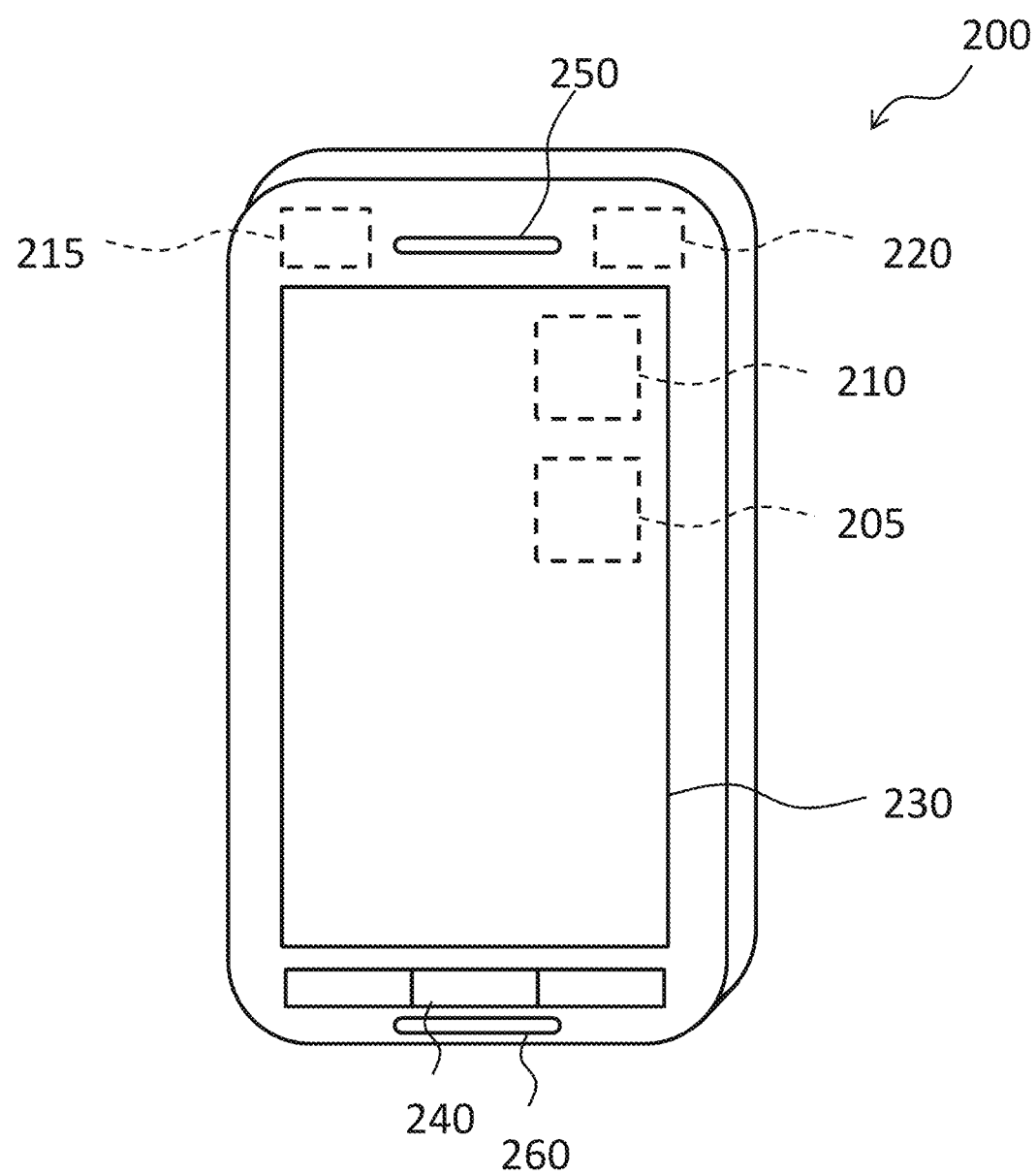
FIG. 4 is a schematic diagram illustrating a hardware structure of a communication terminal used in the vehicle sharing assisting apparatus according to an example embodiment.

FIG. 4 is a schematic diagram illustrating a hardware structure of a communication terminal used in the vehicle sharing assisting apparatus according to an example embodiment. According to FIG. 4, a memory 205, a control unit 210, a near field communication unit 215 and a communication module 220 are provided inside of a body of the user terminal 200. Further, at one side face of the user terminal 200, a display 230, an operation button 240, a speaker 250 and a microphone 260 are provided. Here, the display 230 may have a touch sensor, in which case the operation button 240 does not have to be provided. Further, when the user terminal 200 does not have a call function, it is not necessary to provide the speaker 250 and the microphone 260.

The memory 205 stores data such as computer readable instructions and/or programs for causing the user terminal 200 to execute a specific function, specific information of the user terminal 200 and personal information of the user of the user terminal 200.

The control unit 210 has an arithmetic device such as a CPU and a storage device such as a register. The control unit 210 executes the computer readable instructions and/or programs stored in the memory 205 using the CPU and to implement various functions of the user terminal 200 according to instruction signals input by the users.

The near field communication unit 215, which is a functional unit performing near field communication by utilizing a high frequency radio wave from MHz to GHz, can perform communication within a range from several meters to several tens of meters. The near field communication is communication for receiving a radio wave emitted from a radio source and transmitting various information such as specific information of communication equipment and a distance between the radio source and the communication equipment. Near field communication includes, for example, RFID (Radio Frequency Identifier) and BLE (BlueTooth Low Energy). Here, the near field communication unit 215 has an antenna for receiving a radio wave emitted from the radio source in the above-described near field communication and a logic circuit for analyzing the received radio wave. Further, the near field communication unit 215 may have a logic circuit for modulating the radio wave emitted from the radio source to transmit the specific information of the user terminal 200. The near field communication unit 215 may also be referred to as a near field transceiver.

The communication module 220 includes an antenna and a high frequency circuit for wirelessly transmitting and receiving a signal, a demodulation circuit, or the like. Further, the communication module 220 is controlled by the control unit 210, connected to the network, and accesses the assisting server 110. The communication module 220 may also be referred to as a transceiver.

As the display 230, a liquid crystal display, an organic EL display, or the like, can be employed. Further, as the touch sensor, a resistive film type sensor, a capacitance type sensor, an optical sensor, or the like, can be employed. The user manipulates the user terminal 200 according to display of a display to implement various functions.

Figure 5:
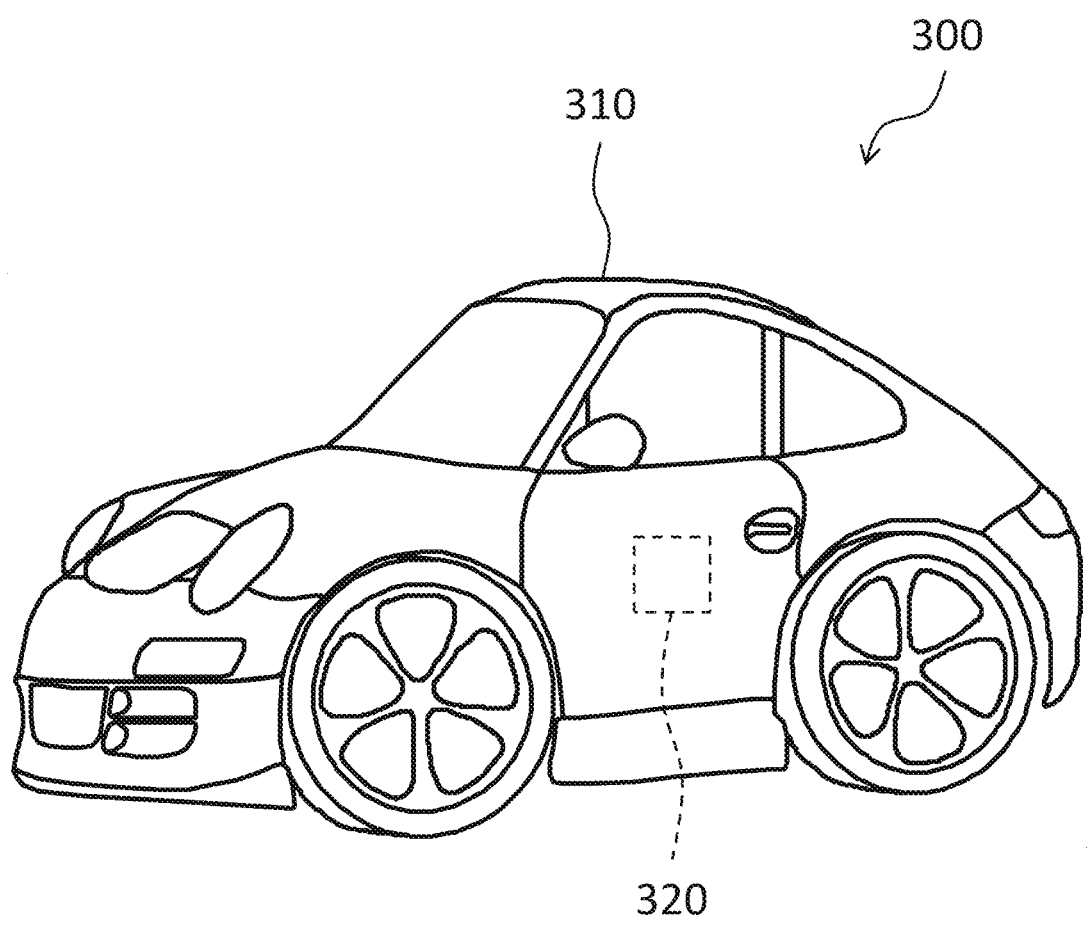
FIG. 5 is a schematic diagram illustrating a hardware structure of a vehicle used in the vehicle sharing assisting apparatus according to an example embodiment.

FIG. 5 is a schematic diagram illustrating a hardware structure of the vehicle used in the vehicle sharing assisting apparatus according to an example embodiment. According to FIG. 5, the vehicle 300 includes a near field communication unit 320 inside a vehicle body 310. The near field communication unit 320 includes a radio source, which emits a radio wave to be used for near field communication. Further, the near field communication unit 320 may have a receiving unit, which receives a radio wave modulated by the near field communication unit 215 of the user terminal 200 and an analyzing unit, which analyzes specific information of the user terminal 200 from the modulated radio wave. The near field communication unit 320 may also be referred to as a near field transceiver.

Figure 6:
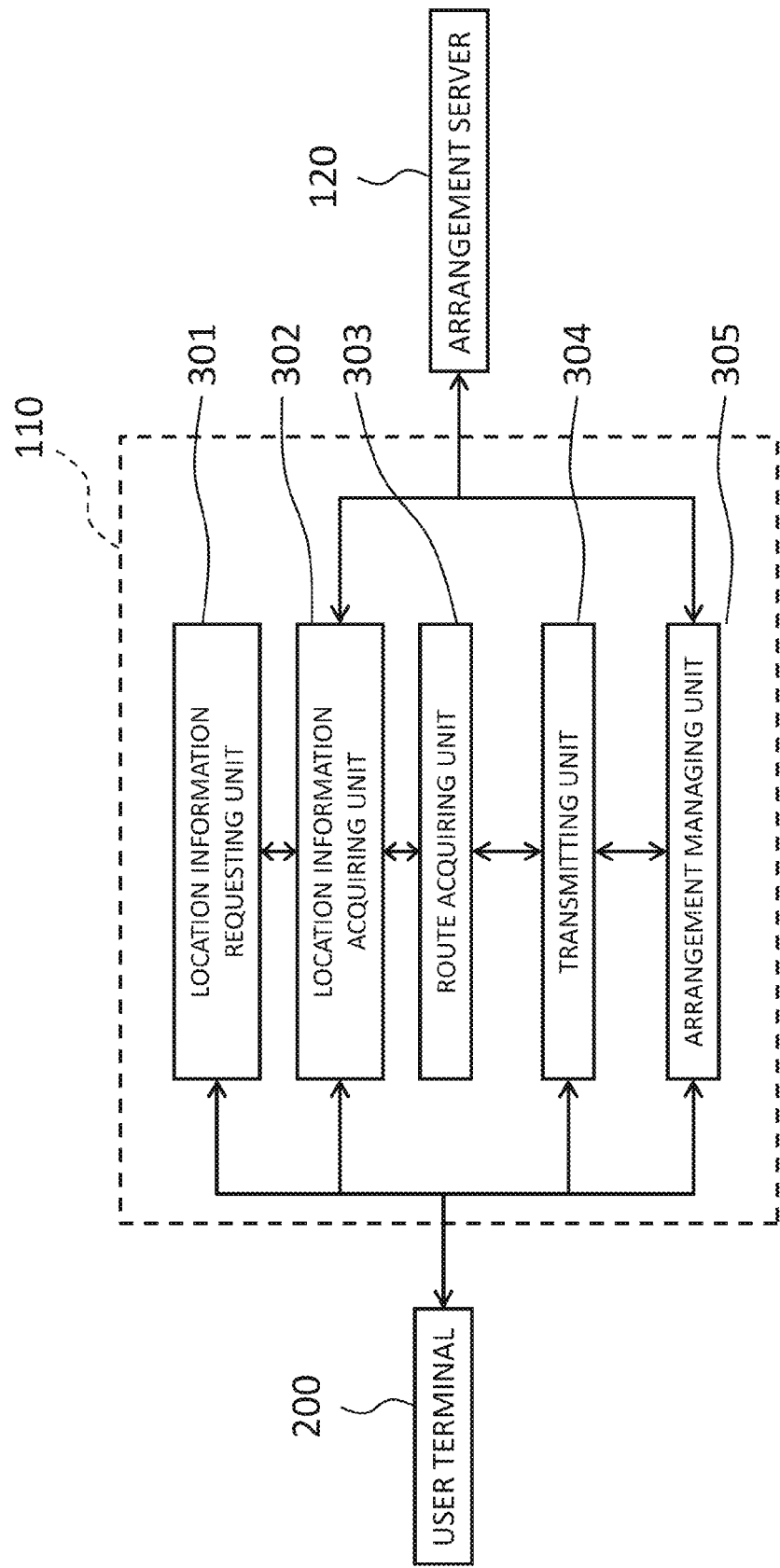
FIG. 6 is a functional block diagram illustrating a configuration of the assisting server used in the vehicle sharing assisting apparatus according to an example embodiment.

FIG. 6 is a functional block diagram illustrating a configuration of the assisting server used in the vehicle sharing assisting apparatus according to an example embodiment. In FIG. 6, each functional block of the assisting server 110 in FIG. 2 will be explained in more detail. According to FIG. 6, the assisting server 110 has a location information requesting unit 301, a location information acquiring unit 302, a route acquiring unit 303, a transmitting unit (or transmitter) 304 and an arrangement managing unit 305.

When the user terminal 200 transmits a vehicle sharing request signal in the vehicle sharing assisting apparatus 10, the location information requesting unit 301 receives the request signal and transmits a location information request signal for requesting first location information of the user terminal 200 to the user terminal 200.

The location information acquiring unit 302 acquires a plurality of pieces of first location information representing locations of a plurality of user terminals 200, which approve the location information request signal transmitted by the location information requesting unit 301, second location information representing a location of the vehicle 300 and third location information representing a location of the destination 400 of the plurality of user terminals 200 and the vehicle 300.

The route acquiring unit 303 selects a vehicle 300 suitable to be shared by the plurality of user terminals 200 based on the first location information (user terminals), the second location information (vehicle) and the third location information (destination) acquired by the location information acquiring unit 302, and acquires a route for reaching the destination 400 by way of the plurality of user terminals 200, which desire to share the selected vehicle 300. Here, the route acquiring unit 303 may have a function of searching a route and the vehicle 300 suitable for vehicle sharing. Alternatively, the route acquiring unit 303 may have a function of acquiring a route and the vehicle 300 suitable for vehicle sharing from routes and vehicles 300 searched by another functional unit.

The transmitting unit 304 transmits the route acquired by the route acquiring unit 303 to the plurality of user terminals 200, which desire to share a vehicle. The transmitting unit 304 can perform transmission by the user terminal 200 performing display through a web view in which processing of displaying the first location information (user terminals), the second location information (vehicle) and the third location information (destination) is performed. Here, in the web view, the first location information to the third location information may be transmitted so as to be displayed with icons which are different from each other. Further, an image specifying a user registered in the SNS service may be used as an icon indicating the first location information of the user terminal 200, which utilizes the SNS service provided by the SNS server 130 among the first location information of the user terminals 200 which desire to share a vehicle. Alternatively, the transmitting unit 304 may transmit text information of the first location information to the third location information to the user terminals 200. The transmitting unit 304 may include one or more interfaces, antennas, and corresponding circuitry, for transmitting/receiving data over a wired and/or wireless connection.

The arrangement managing unit 305 requests arrangement of the vehicle 300 to the arrangement server 120 when the user terminal 200 settles an arrangement order in the vehicle sharing assisting apparatus 10. Here, the arrangement managing unit 305 may have a delay function so as to request arrangement of the vehicle 300 to the arrangement server 120 after a given (or, alternatively, desired or predetermined) period has elapsed since the user terminal 200 settled the arrangement order. The arrangement managing unit 305 can accept cancellation of the arrangement order from the user terminal 200 during the delay period. The arrangement managing unit 305 requests arrangement of the vehicle 300 to the arrangement server 120 if the arrangement order is not cancelled during the delay period.

Further, the arrangement managing unit 305 notifies the user terminals 200 of a situation of the first location information (user terminals), the second location information (vehicle) and the third location information (destination) while the vehicle 300 is headed to pick up the user. Further, the arrangement managing unit 305 may provide a manner in which to inquire (e.g., by calling or sending a message) about the vehicle 300 for the user terminals 200 while the vehicle 300 is headed to pick up the user. Further, the arrangement managing unit 305 may also provide a mechanism to evaluate the vehicle 300 utilized by the user terminal 200 for the user terminals 200, which have utilized the vehicle 300. Conversely, the arrangement managing unit 305 may provide a manner in which to evaluate the user terminals 200 that utilized the vehicle 300 for the vehicle 300, which has been utilized by the user terminals 200. It should be noted that these evaluation results are stored in the database 115. Here, it is also possible to change priority of the vehicle 300 utilized by the user terminals 200 and/or priority of the user terminals 200 to which service of the vehicle sharing assisting apparatus 10 are to be provided based on the evaluation results.

Figure 7:
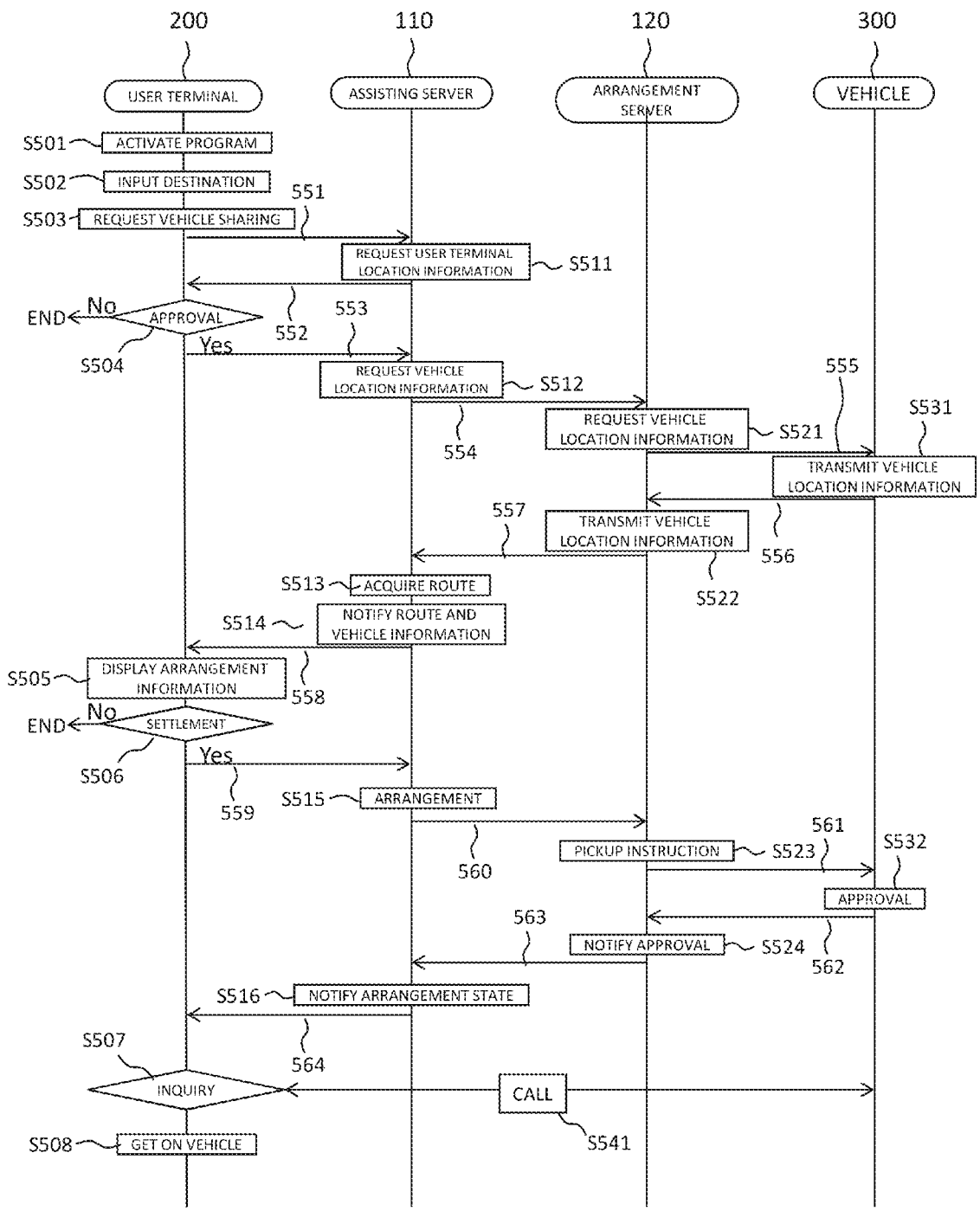
FIG. 7 is a diagram illustrating an operation flow of the vehicle sharing assisting apparatus according to an example embodiment.

FIG. 7 is a diagram illustrating an operation flow of the vehicle sharing assisting apparatus according to an example embodiment. In FIG. 7, operation of each block of the vehicle sharing assisting apparatus 10 illustrated in FIG. 2 will be described in detail using a flowchart.

Figure 8:
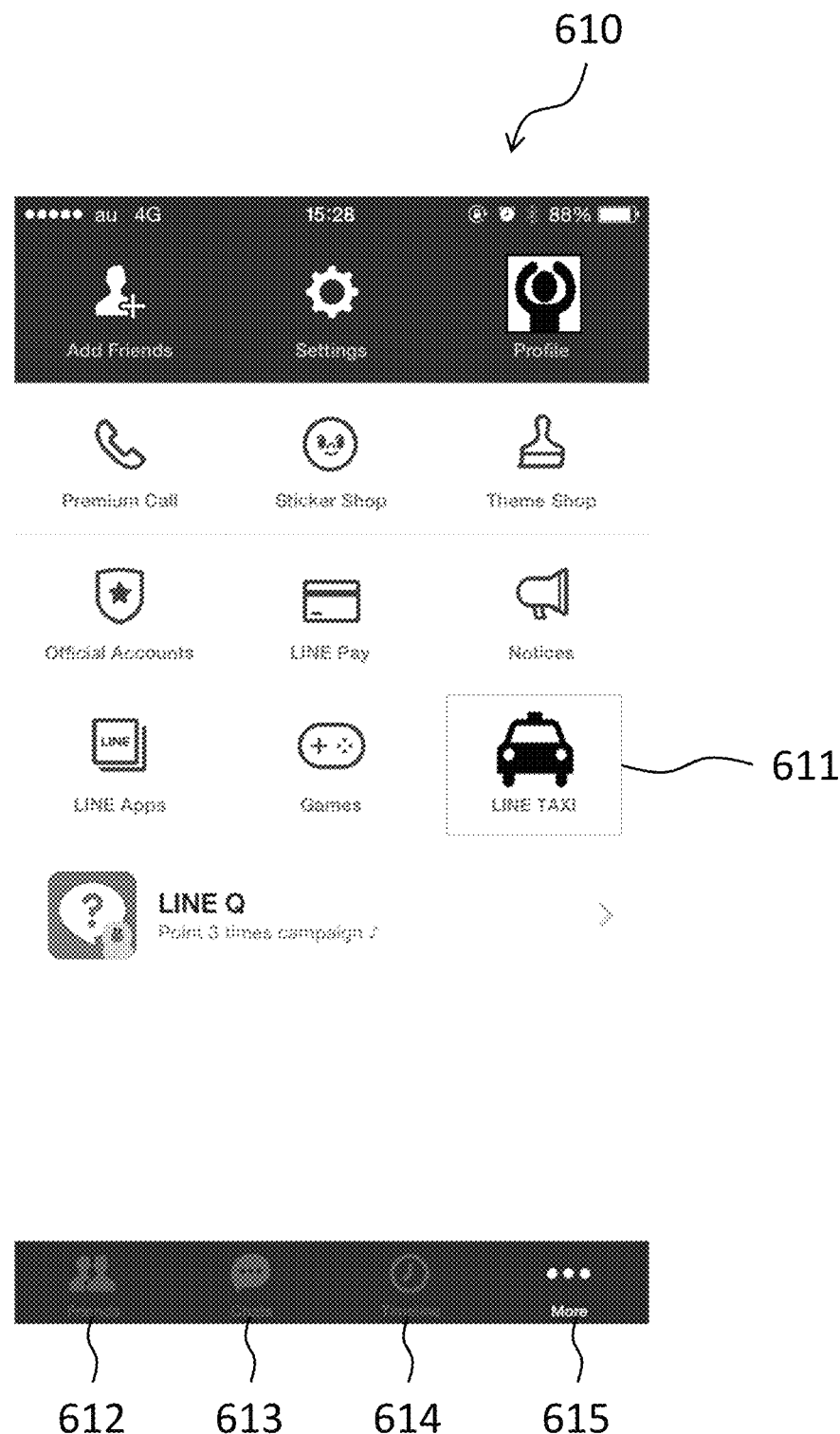
FIG. 8 is a diagram illustrating one example of an interface displayed at a user terminal when a program of the vehicle sharing assisting apparatus is activated in the operation flow of the vehicle sharing assisting apparatus according to an example embodiment.
Figure 9:
FIG. 9 is a diagram illustrating one example of the interface displayed at the user terminal when the program of the vehicle sharing assisting apparatus is activated in the operation flow of the vehicle sharing assisting apparatus according to an example embodiment.

Referring to FIG. 7, computer readable instructions and/or programs for causing the vehicle sharing assisting apparatus 10 to operate are activated by the user terminal 200 (step S501). Here, examples of an interface displayed at the user terminal when the program of the vehicle sharing assisting apparatus 10 is activated in step S501 are illustrated in FIG. 8 and FIG. 9. The interface 610 illustrated in FIG. 8 is a setting screen in the SNS service provided by the SNS server 130. As illustrated in FIG. 8, the interface 610 has a vehicle icon 611, and when the vehicle icon 611 is selected, the program of the vehicle sharing assisting apparatus 10 is activated. Here, the interface 610 has a plurality of tabs such as a Friends tab 612, a Chats tab 613, a Timeline tab 614 and a More tab 615. A tab for activating the program of the vehicle sharing assisting apparatus 10 may be arranged on one of the plurality of tabs.

When the vehicle icon 611 of the interface 610 is selected, an interface 620 in FIG. 9 is displayed. The interface 620 is a top screen of the vehicle sharing assisting apparatus 10. In the interface 620, when a request button 621 is selected, the user terminal 200 can access the assisting server 110. Here, when the vehicle sharing assisting apparatus 10 is utilized for the first time, an interface 630 for user registration illustrated in FIG. 10 may be displayed. On the interface 630, input fields for at least name and a phone number of the user terminal 200 are displayed. Here, on the interface 630, input fields for credit card information, or the like, of the user may be displayed as necessary.

Figure 11:
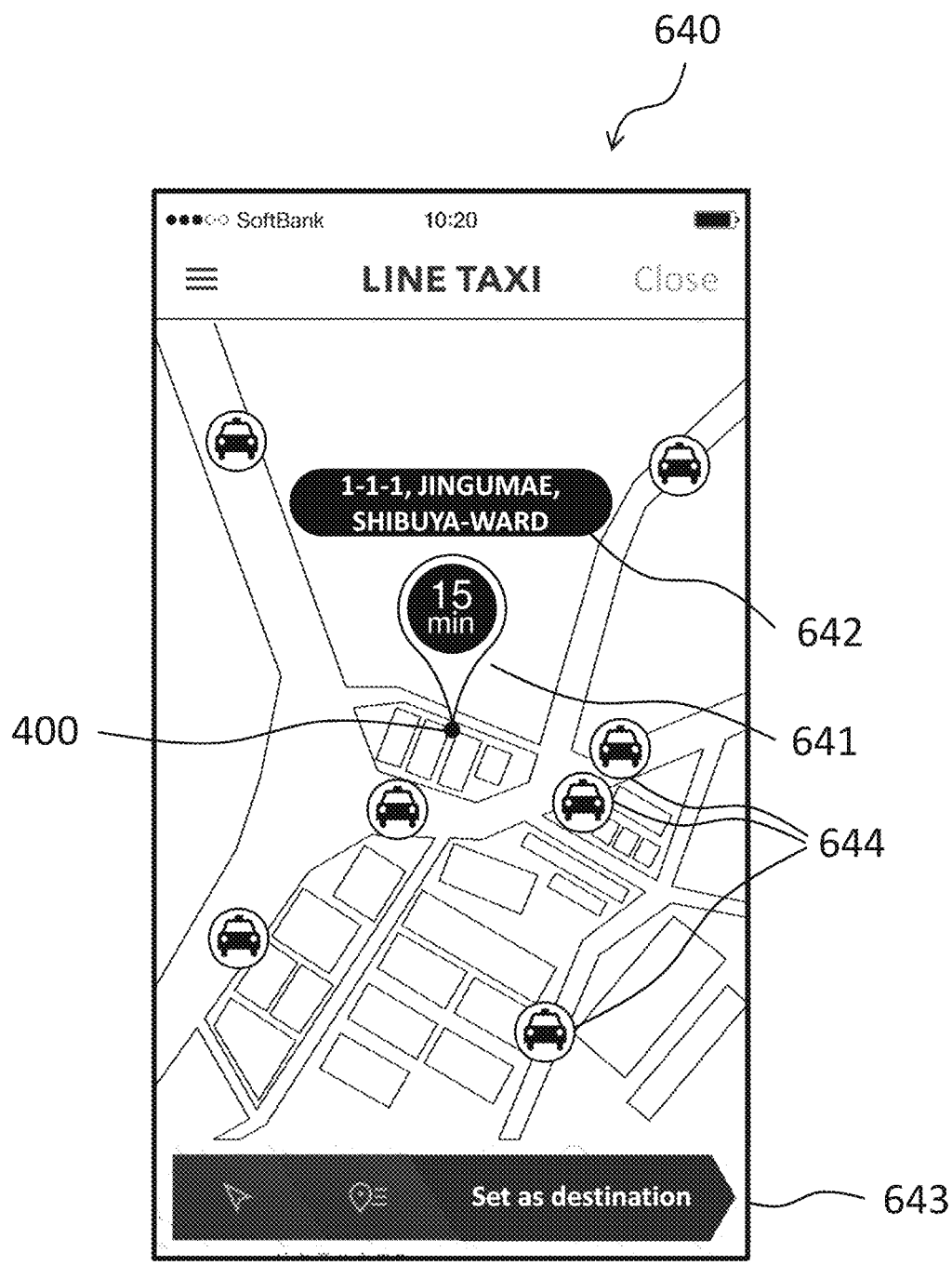
FIG. 11 is a diagram illustrating one example of an interface allowing input of a destination in the operation flow of the vehicle sharing assisting apparatus according to an example embodiment.

Referring back to FIG. 7, a destination to which the user desires to travel is input at the user terminal 200 (step S502). Here, an example of an interface displayed at the user terminal when the destination is input in step S502 is illustrated in FIG. 11. The interface 640 illustrated in FIG. 11 is a map displayed through a web view function. The user selects the destination 400 on the map using the user terminal 200. A destination pin 641, which serves as a landmark is displayed at the selected destination 400. Further, destination address 642 is displayed above the destination pin 641. When the selected destination 400 is set, a setting button 643 is selected, and thereby the third location information of the destination 400 is transmitted from the user terminal 200 to the assisting server 110.

In FIG. 11, time (15 minutes) expected to be required to reach the destination 400 from a current location of the user terminal 200 is displayed at the destination pin 641. Further, a plurality of vehicles 644 managed by the arrangement server 120 are displayed on the map. Here, a function of displaying the destination address 642, the time required to reach the destination 400 or the vehicles 644 can be omitted and may be provided as an optional function.

Referring again to FIG. 7, if the user terminal 200 takes an action to request for vehicle sharing using the vehicle sharing assisting apparatus 10, a vehicle sharing request signal 551 is transmitted from the user terminal 200 to the assisting server 110 (step S503). Here, the order of step S502 and step S503 may be changed.

When the assisting server 110 receives the vehicle sharing request signal 551 transmitted from the user terminal 200, the assisting server 110 transmits a user terminal location information request signal 552 to the user terminal 200, which transmits the vehicle sharing request signal 551 and other user terminals 200 which desire to share the vehicle (step S511).

When the user terminal location information request signal 552 transmitted from the assisting server 110 is received by the plurality of user terminals 200, it is confirmed whether to approve the user terminal location information request signal 552 at each of the plurality of user terminals 200 (step S504).

If the user terminal 200 approves the user terminal location information request signal 552 in step S504 (step S504: Yes), then the first location information 553 of the user terminal 200 that approves the user terminal location information request signal 552 is transmitted from the user terminal 200 to the assisting server 110. Meanwhile, if the user terminal 200 does not approve the user terminal location information request signal 552 (step S504: No), then the operation flow ends, and the program is finished, or the screen shifts to the top screen.

Figure 12:
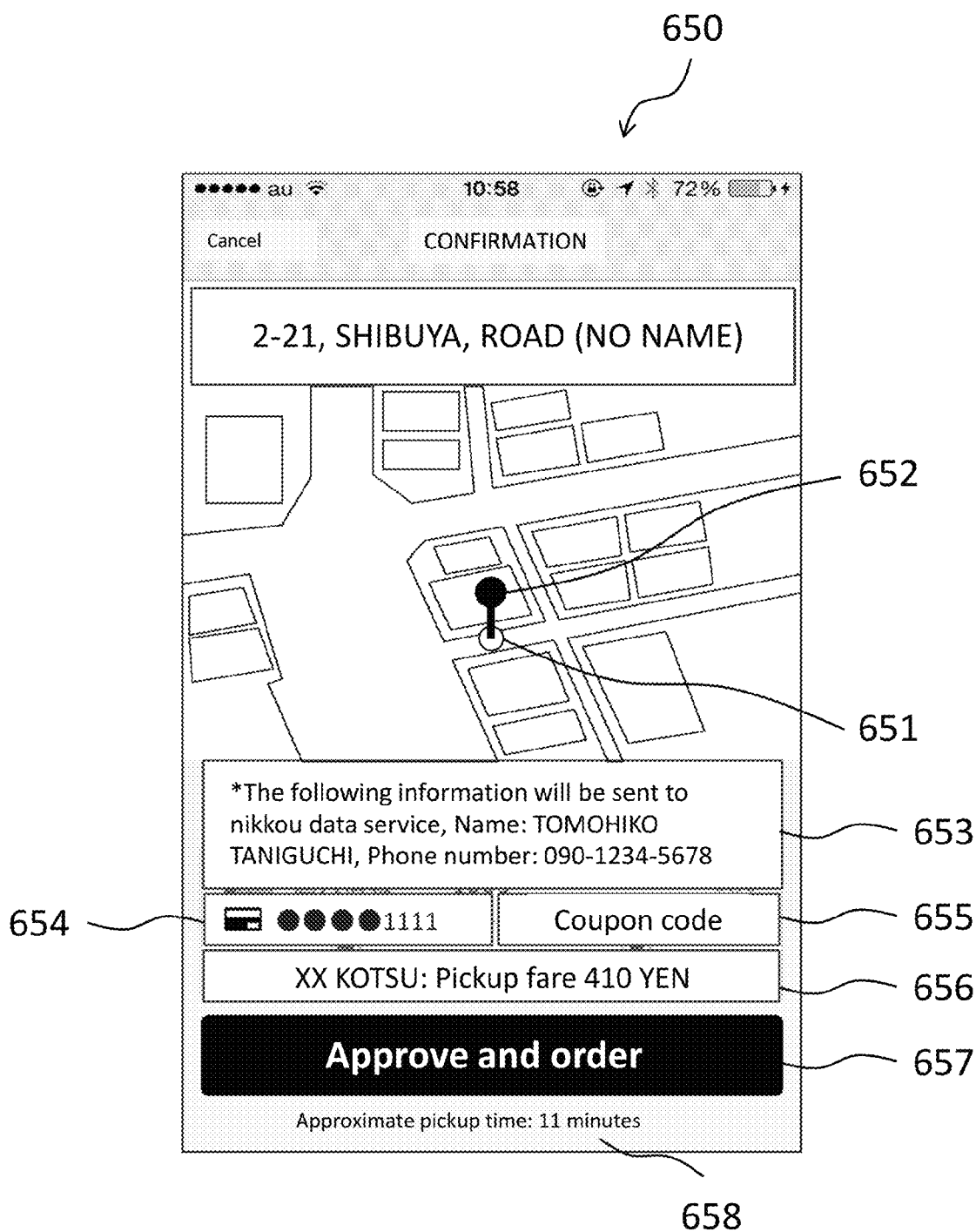
FIG. 12 is a diagram illustrating one example of an interface for confirming approval for a user terminal location information request in the operation flow of the vehicle sharing assisting apparatus according to an example embodiment.
Figure 13:
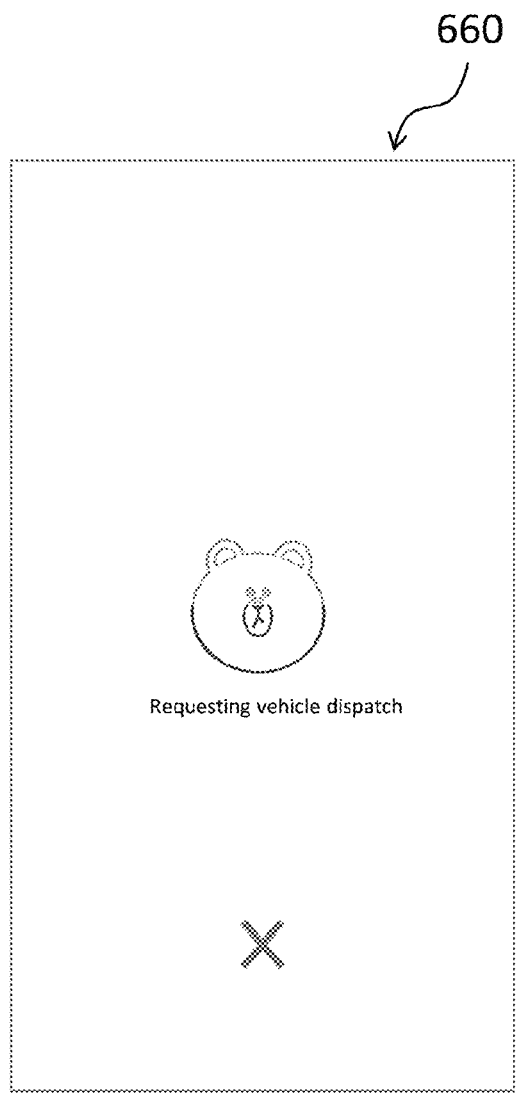
FIG. 13 is a diagram illustrating an example of screen display after an arrangement order is settled.

Here, an example of an interface for confirming whether to approve the user terminal location information request signal in step S504 is illustrated in FIG. 12. The interface 650 illustrated in FIG. 12 is a map displayed through a web view function. On the map illustrated in FIG. 12, a first location information pin 652 is displayed at the first location information 651 of the user terminal 200 to which the user terminal location information request signal 552 is transmitted. When an approval button 657 is selected at the user terminal 200, the first location information 651 is transmitted from the user terminal 200 to the assisting server 110.

Further, on the interface 650 illustrated in FIG. 12, a user information confirmation field 653 in which user information (such as, e.g., name and a phone number) of the user terminal 200 is displayed, a user registered credit card information field 654 in which credit card information registered at the sharing assisting apparatus 10 is displayed, a coupon code field 655 in which information of a coupon the user possesses is displayed, an arrangement center information field 656 in which information to be notified, such as the pickup fare, from the arrangement center to the user terminal is displayed, and a pickup information field 658 in which expected pickup time, or the like, are displayed, are provided. Here, it is only necessary for the interface 650 to have at least a function for confirming approval, whereas other functions can be omitted and may be provided as optional functions.

Still referring to FIG. 7, when the assisting server 110 receives the first location information 553 of the user terminal 200 transmitted from the user terminal 200, the assisting server 110 transmits a vehicle location information request signal 554 to the arrangement server 120 (step S512). Here, the third location information of the destination 400 may be transmitted along with the vehicle location information request signal 554 in step S512.

When the arrangement server 120 receives the vehicle location information request signal 554 transmitted from the assisting server 110, the arrangement server 120 transmits a vehicle location information request signal 555 to the vehicle 300 managed by the arrangement server 120 via the second network 102 of the arrangement server (step S521). Here, the vehicle 300 to which the vehicle location information request signal 555 is to be transmitted may be selected based on the third location information of the destination 400 in step S521. More specifically, the vehicle location information request signal 555 may be transmitted only to vehicles 300 located in an area within a threshold (or, alternatively, given, desired or predetermined) range centering around the third location information of the destination 400.

When each vehicle 300 receives the vehicle location information request signal 555 transmitted from the arrangement server 120, each vehicle 300 returns the second location information 556 of the vehicle 300 to the arrangement server 120 (step S531). Here, information including an actual state (such as, e.g., vacant, not in service, reserved, in service, etc.) of the vehicle 300 may be returned along with the second location information 556.

When the arrangement server 120 receives the second location information 556 returned from each vehicle 300, the arrangement server 120 transmits the second location information 557 to the assisting server 110 (step S522). Here, the vehicle 300 that transmits the second location information 557 may be selected based on the third location information of the destination 400 in step S522. More specifically, among the second location information 556 returned from each vehicle 300, only the second location information 557 included in a threshold range centered around the third location information of the destination 400 may be transmitted from the arrangement server 120 to the assisting server 110.

When the assisting server 110 receives the second location information 557 transmitted from the arrangement server 120, the assisting server 110 acquires a route for reaching the third location information from the second location information by way of the plurality of pieces of the first location information based on the first location information of the user terminals 200, the second location information of the vehicle 300 and the third location information of the destination (step S513). Here, locations on the route acquired in step S513 are not limited to the locations of the respective user terminals 200 at the time when the route is acquired, but rather arbitrary locations designated by the respective user terminals 200 may be set.

Still referring to FIG. 7, subsequently, the assisting server 110 transmits the route and vehicle information 558 acquired in step S513 to the user terminal 200 (step S514). Here, one or a plurality of pieces of route and vehicle information 558 may be transmitted to the user terminal.

When the user terminal 200 receives the route and vehicle information 558 transmitted from the assisting server 110, a route for reaching the destination 400 and detailed information of candidate vehicles to be utilized are displayed as arrangement information at the user terminal 200 (step S505).

After the route and vehicle information 558 is displayed at the user terminal 200, it is confirmed whether to settle an arrangement order with the displayed route and vehicle (step S506). If the user terminal 200 settles the arrangement order with the displayed route and vehicle in step S506 (step S506: Yes), then arrangement order settlement information 559 is transmitted from the user terminal 200 to the assisting server 110. Meanwhile, if the user terminal 200 does not settle the arrangement order (step S506: No), then the operation flow ends, and the program is finished, or the screen shifts to the top screen.

Here, settlement of the arrangement order may be confirmed with all of the plurality of users who desire to share the vehicle or with at least one user among the plurality of users who desire to share the vehicle. For example, settlement of the arrangement order may be confirmed with only the user terminal 200, which transmits the vehicle sharing request signal 551 in step S503.

When the assisting server 110 receives the arrangement order settlement information 559 transmitted from the user terminal 200, the assisting server 110 transmits an arrangement request signal 560 to the arrangement server 120 (step S515). Here, the arrangement request signal 560 in step S515 may be transmitted to the arrangement server 120 after a given (or, alternatively, desired or predetermined) period (referred to herein as a delay period) has elapsed since the arrangement order was settled in step S506. Further, during the above-described delay period, the assisting server 110 may provide an interface 660 for accepting cancellation of the arrangement order as illustrated in, for example, FIG. 13 at the user terminal 200.

When the arrangement server 120 receives the arrangement request signal 560, a pickup instruction signal 561 is transmitted to the vehicle 300 selected through route acquisition in step S513 (step S523). If the vehicle 300 that receives the pickup instruction signal 561 is available for picking up the user, then the vehicle 300 returns an approval signal 562 to the arrangement server 120 (step S532).

When the arrangement server 120 receives the approval signal 562 returned from the above-described vehicle 300, the arrangement server 120 transmits an approval notification 563 to the assisting server 110 (step S524). When the assisting server 110 receives the approval notification 563, the assisting server 110 transmits an arrangement state notification 564 to the user terminal 200 (step S516). The arrangement state notification 564 includes vehicle information (such as, e.g., a type of vehicle, a vehicle number, driver information and an actual state) of the vehicle headed to pick up the user, and information such as the current location of the vehicle 300. Further, the arrangement state notification 564 may further include time expected to arrive at the location of the user terminal 200 that will get on the vehicle 300 next, time expected to arrive at the location of the destination 400, traffic congestion information, and the like.

The assisting server 110 provides an interface 670, as illustrated in, for example, FIG. 14, for accepting an inquiry about the vehicle 300 headed to pick up the user for the user terminal 200, which receives the arrangement state notification 564 transmitted in step S516 (step S507). It is also possible to allow the user to call a driver of the vehicle 300 by utilizing the interface 670 illustrated in FIG. 14 when the user desires to inquire about the vehicle 300 headed to pick up the user (step S541). When the vehicle 300 headed to pick up the user arrives at the location of the user terminal 200 which is going to get on the vehicle 300, as illustrated in FIG. 15, the vehicle 300 provides an interface 680 for notifying the user that the vehicle 300 has arrived at the location (step S508).

Figure 15:
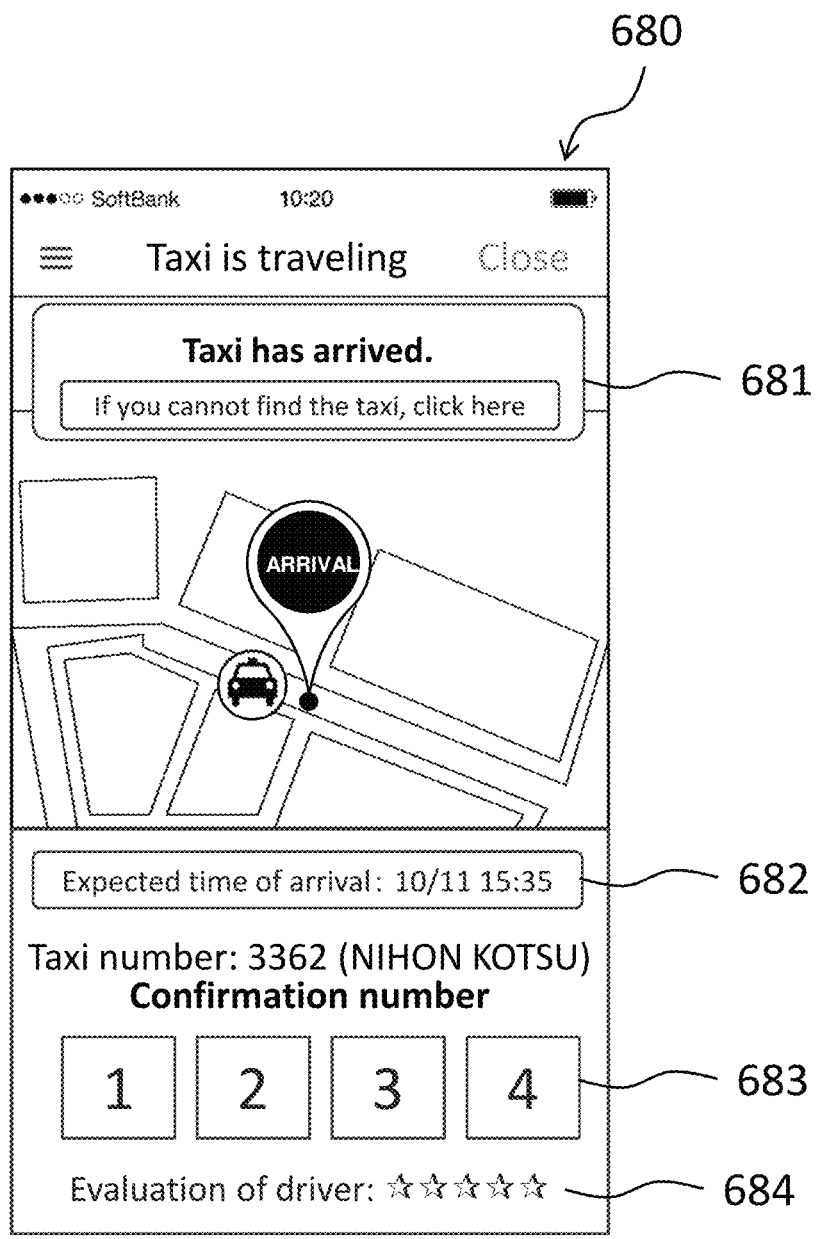
FIG. 15 is a diagram illustrating an example of screen display when the vehicle arrives at a location of the user terminal in the operation flow of the vehicle sharing assisting apparatus according to an example embodiment.

Here, when the user who is going to get on the vehicle cannot find the vehicle 300 (taxi), an inquiry button 681 for connecting the user terminal 200 and a mobile phone of the driver of the vehicle 300 so that the user can call the driver may be provided on the interface 680 in FIG. 15. The user terminal 200 can automatically call the mobile phone of the driver of the vehicle 300 by pressing the inquiry button 681. Alternatively, it is also possible to allow the mobile phone of the driver of the vehicle 300 to automatically call the user terminal 200 by the inquiry button 681 being pressed. Further, the interface 680 may include expected time 682 of arrival at the destination 400, a confirmation number 683 indicating that the user terminal 200 is a terminal which places the arrangement order, and driver evaluation 684.

As described above, the vehicle 300 can reach the destination 400 by way of the plurality of user terminals 200 which desire to share the vehicle.

While FIG. 7 illustrates an operation flow in which the destination is input in step S502 before vehicle sharing is requested in step S503, the operation flow is not limited to this example. For example, input of the destination in step S502 may be performed after it is confirmed whether to approve the user terminal location information request signal 552 in step S504. That is, for example, input of the destination in step S502 may be performed at any point from when the program is activated in step S501 until when the vehicle location information is requested in step S512.

Further, while FIG. 7 illustrates the operation flow in which the arrangement server 120 requests the vehicle location information to the vehicle 300 in step S521 after receiving the vehicle location information request in step S512, the operation flow is not limited to this example. For example, the arrangement server 120 can regularly acquire the third location information of the vehicle 300 at given (or, alternatively, desired or predetermined) time intervals and store the third location information in the database 125. Further, in response to the vehicle location information request in step S512, the arrangement server 120 may transmit the third location information stored in the database 125 to the assisting server 110. That is, for example, in the operation flow in FIG. 7, steps S521 and S531 may be omitted, and transmission of the vehicle location information in step S522 may be performed immediately after the vehicle location information is requested in step S512.

Figure 16:
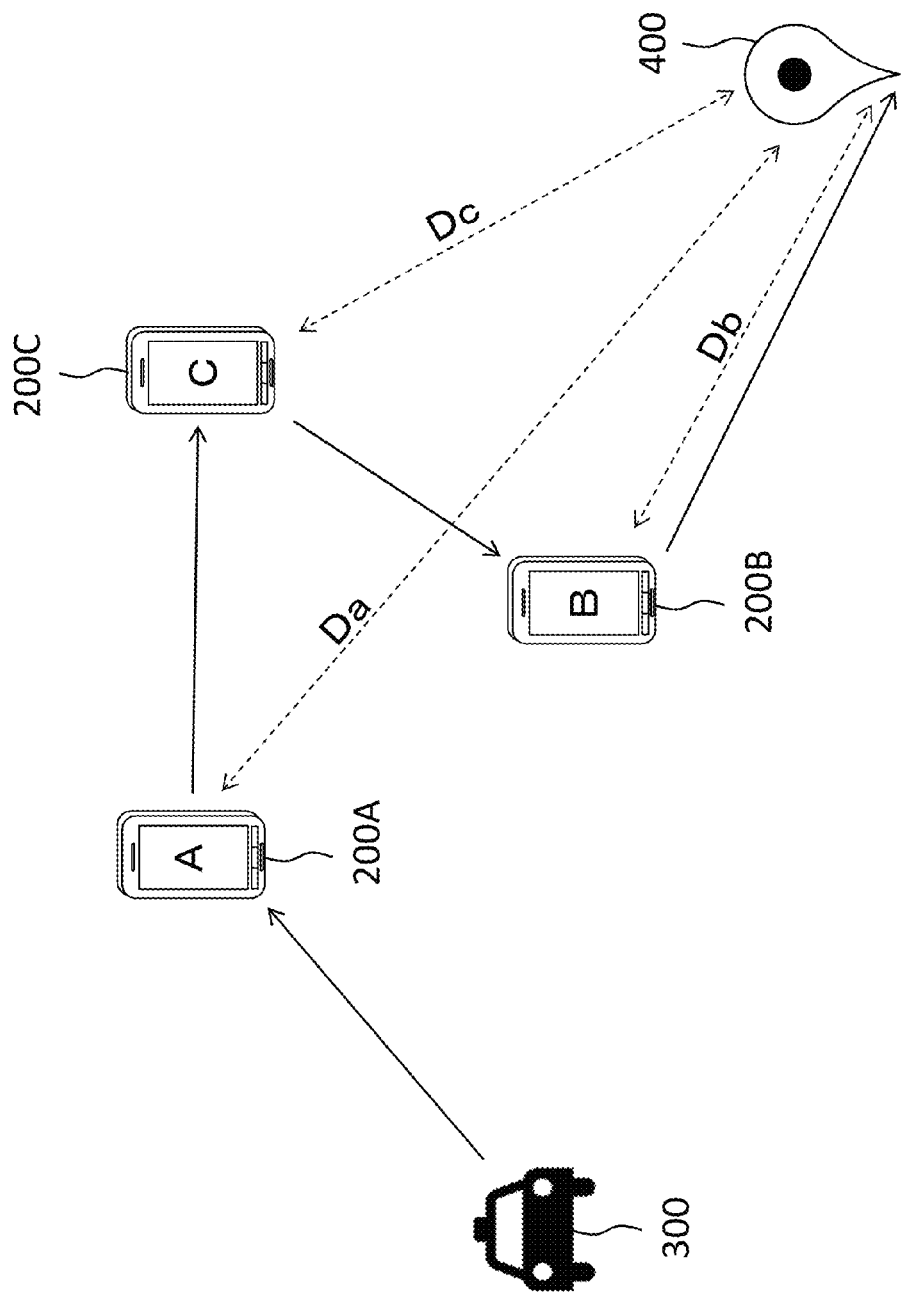
FIG. 16 is a diagram illustrating an example of a route acquiring method of a route acquiring unit of the assisting server used in the vehicle sharing assisting apparatus according to an example embodiment.

An example embodiment of a route acquiring method of the route acquiring unit 303 of the assisting server 110 illustrated in FIG. 6 will be described in more detail with regard to FIG. 16. The route acquiring unit 303 in the vehicle sharing assisting apparatus 10 according to at least this example embodiment acquires a route which first passes through the first location information (user terminal 200A) that is relatively far from the third location information (destination 400) among the plurality of pieces of first location information (user terminals 200A, 200B and 200C).

The route acquiring unit 303 first calculates a distance Da between the user terminal 200A and the destination 400, a distance Db between the user terminal 200B and the destination 400 and a distance Dc between the user terminal 200C and the destination 400 in route acquisition in step S513 in FIG. 7, and designates a user terminal for which the distance is relatively long (e.g., relatively far from the destination 400) among the distances Da, Db and Dc as a user terminal which first gets on the vehicle. For example, in the example of FIG. 16, as indicated with the route expressed with a solid line, the route acquiring unit 303 provides a route on which the user terminal 200A, which is the farthest from the destination 400, gets on the vehicle first.

However, the route provided by the route acquiring unit 303 is not limited to the route on which the user terminal 200, which is the farthest from the destination 400, gets on the vehicle first, but may be the route on which the user terminal 200 which is relatively far from the destination 400 among the plurality of user terminals 200A, 200B and 200C gets on the vehicle first. Further, the order of the plurality of user terminals 200A, 200B and 200C to get on the vehicle may be arbitrarily determined by each of the user terminals.

Here, the distances Da, Db and Dc are distances on the road map. For example, the distance Da is a distance of a route on the road map from the user terminal 200A to the destination 400. However, the distances Da, Db and Dc are not limited to the distances on the road map, and may be linear distances connecting the respective location information. It should be noted that the distance on the road map is not a linear distance between two points, but a distance in the case where the vehicle travels based on the road map.

As described above, according to the vehicle sharing assisting apparatus 10 according to at least this example embodiment, it is possible to provide a vehicle sharing assisting apparatus which assists a plurality of users to share a vehicle 300 when user terminals 200 which desire to share a vehicle requests for sharing a vehicle, and which provides a vehicle 300 suitable to be shared and a route from the vehicle 300 to a destination 400, and a non-transitory computer readable medium storing computer readable instructions and/or programs for assisting vehicle sharing.

Further, because the plurality of user terminals 200 which utilize the vehicle sharing assisting apparatus 10 build social relationships approved by each other in a given (or, alternatively, desired or predetermined) service subscribed to by the plurality of user terminals 200, it is not necessary to newly input personal information to utilize the vehicle sharing assisting apparatus 10, and it is possible to utilize information of the given service. Further, because users with whom the user shares a vehicle are acquaintances, the user can utilize the vehicle sharing assisting apparatus 10 relatively easily. Therefore, a threshold for utilization of the vehicle sharing assisting apparatus 10 is lowered, so that it is possible to provide an advantage that more users can more easily utilize the apparatus. Further, because the route acquiring unit 303 acquires a route which first passes through a user terminal 200, which is relatively far from the location information of the destination 400 among the location information of the plurality of user terminals 200, it is possible to reduce a travel distance of the vehicle 300 and acquire a route more efficiently for the plurality of users.

Figure 17:
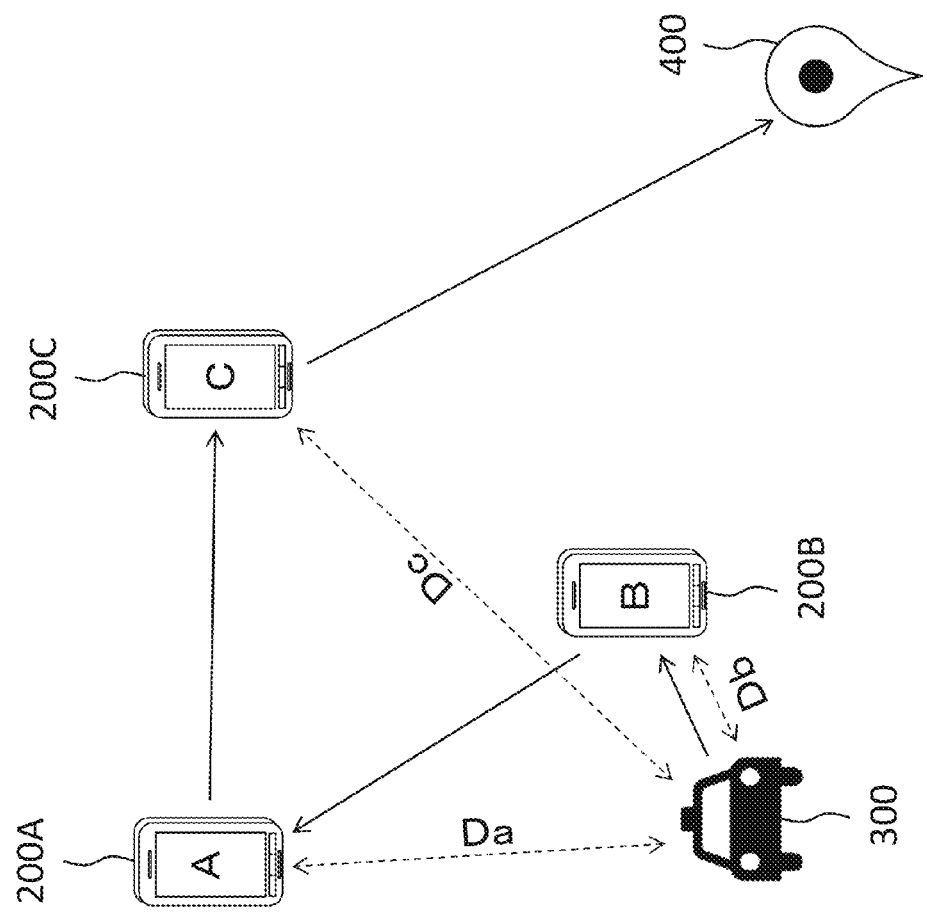
FIG. 17 is a diagram illustrating an example of a route acquiring method of a route acquiring unit of an assisting server used in a vehicle sharing assisting apparatus according to another example embodiment.

Another example embodiment will be described with regard to FIG. 17. FIG. 17 is a diagram illustrating one example of a route acquiring method of a route acquiring unit of an assisting server used in a vehicle sharing assisting apparatus according to another example embodiment. The vehicle sharing assisting apparatus 11 according to this example embodiment is similar to the vehicle sharing assisting apparatus 10, except that in the vehicle sharing assisting apparatus 11, the route acquiring unit 303 acquires a route which first passes through the first location information which is relatively close to the second location information (vehicle) among the plurality of pieces of first location information (user terminals).

In the vehicle sharing assisting apparatus 11, the route acquiring unit 303 first calculates a distance Da between the user terminal 200A and the vehicle 300, a distance Db between the user terminal 200B and the vehicle 300, and a distance Dc between the user terminal 200C and the vehicle 300, and designates a user terminal for which the distance is relatively short (e.g., relatively close to the vehicle 300) among the distances Da, Db and Dc as a user terminal which gets on the vehicle first. For example, in the example of FIG.

17, as indicated with a route expressed with a solid line, the route acquiring unit 303 provides a route on which the user terminal 200B which is the closest to the vehicle 300 gets on the vehicle first.

However, the route provided by the route acquiring unit 303 is not limited to a route on which the user terminal 200 which is the closest to the vehicle 300 gets on the vehicle first, and may be a route on which the user terminal 200 which is relatively close to the vehicle 300 among the plurality of user terminals 200A, 200B and 200C gets on the vehicle first.

Here, the distances Da, Db and Dc are distances on the road map. For example, the distance Da is a distance of a route on the road map from the user terminal 200A to the destination 400. However, the distances Da, Db and Dc are not limited to the distances on the road map, but may be linear distances connecting the respective location information.

As described above, according to the vehicle sharing assisting apparatus 11 according to at least this example embodiment, it is possible to select the vehicle 300 to be utilized according to states of the vehicles 300 located around the respective user terminals which desire to share the vehicle.

Another example embodiment of a vehicle sharing assisting apparatus and a vehicle sharing assisting apparatus including computer readable instructions and/or programs for assisting vehicle sharing will be described in detail with reference to FIG. 18 to FIG. 20. It should be noted that because the overview of the vehicle sharing assisting apparatus, the hardware structure of the assisting server, the hardware structure of the user terminal and the hardware structure of the vehicle are the same or substantially the same as those of the vehicle sharing assisting apparatus 10 according to the above-described example embodiment, and the explanation thereof will be omitted here.

Figure 18:
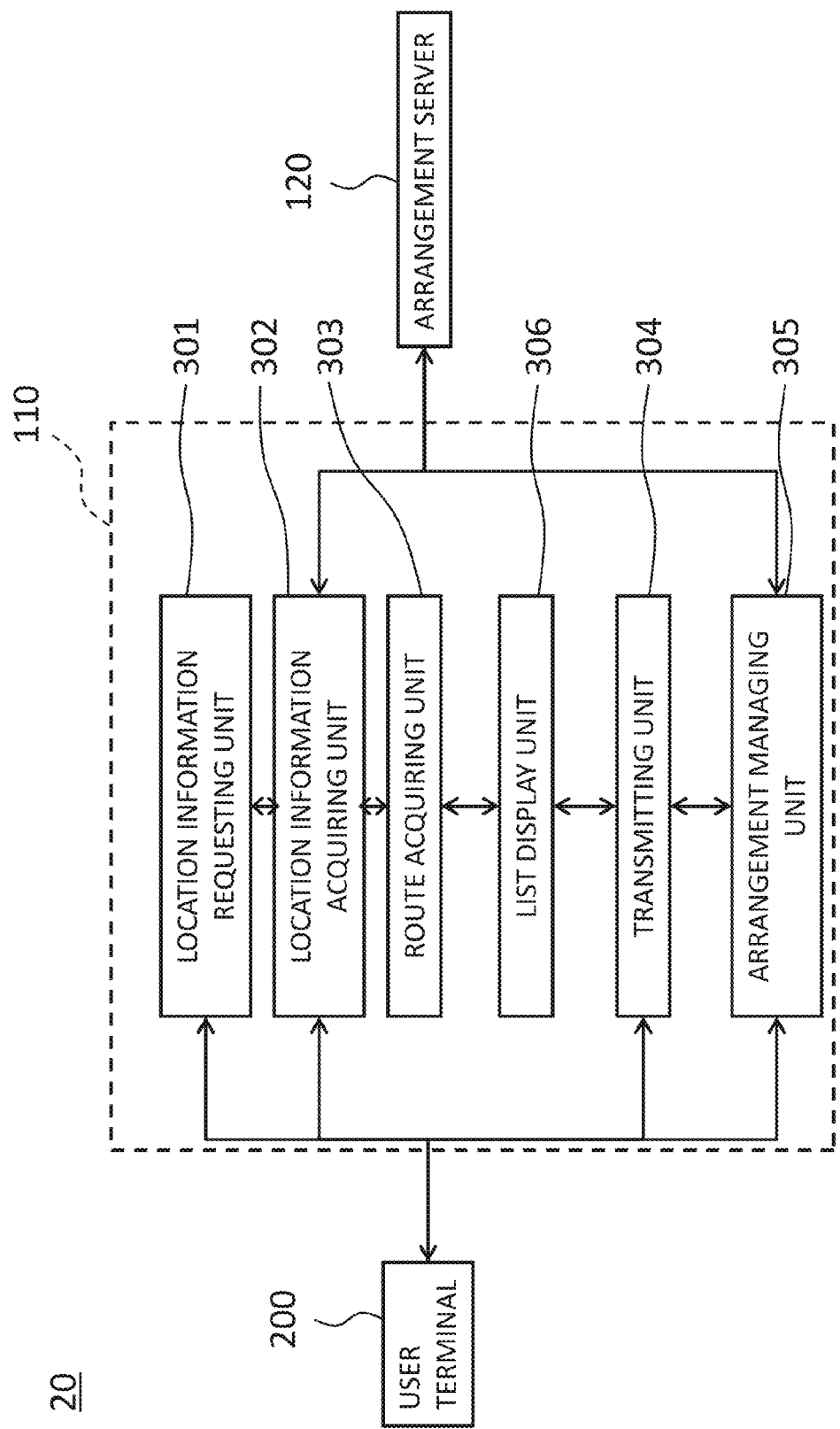
FIG. 18 is a functional block diagram illustrating a configuration of the assisting server used in the vehicle sharing assisting apparatus according to an example embodiment.

FIG. 18 is a functional block diagram illustrating a configuration of the assisting server used in the vehicle sharing assisting apparatus according to another example embodiment. As illustrated in FIG. 18, the assisting server 110 of the vehicle sharing assisting apparatus 20 has a location information requesting unit 301, a location information acquiring unit 302, a route acquiring unit 303, a transmitting unit 304, an arrangement managing unit 305 and a list display unit 306. Here, because the location information requesting unit 301, the location information acquiring unit 302, the route acquiring unit 303, the transmitting unit 304 and the arrangement managing unit 305 are the same or substantially the same as those of the vehicle sharing assisting apparatus 10, the explanation thereof will be omitted.

Here, in the assisting server 110 of the vehicle sharing assisting apparatus 20, the location information acquiring unit 302 acquires the plurality of pieces of second location information (location information of vehicles), and the route acquiring unit 303 acquires a route for each of the plurality of pieces of second location information acquired by the location information acquiring unit 302. The list display unit 306 displays a list of a plurality of routes acquired for the plurality of pieces of second location information in a given (or, alternatively, desired or predetermined) order. Because basic functions of the location information acquiring unit 302 and the route acquiring unit 303 are the same as those of the vehicle sharing assisting apparatus 10, the explanation thereof will be omitted.

An example embodiment of a route acquiring method of the route acquiring unit 303 of the assisting server 110 illustrated in FIG. 18 will be described in more detail using FIG. 19. FIG. 19 is a diagram illustrating an example embodiment of the route acquiring method of the route acquiring unit of the assisting server used in the vehicle sharing assisting apparatus. The route acquiring unit 303 in the vehicle sharing assisting apparatus 20 according to this example embodiment calculates a distance between each of the plurality of pieces of first location information (e.g., user terminals 200A, 200B and 200C) and each of the plurality of pieces of second location information (e.g., vehicles 300A, 300B and 300C), and acquires a route for each of the plurality of first location information. In FIG. 19, a route on which the vehicle 300A, which is the closest to the user terminal 200A, is to be shared is acquired for the user terminal 200A, a route on which the vehicle 300B, which is the closest to the user terminal 200B, is to be shared is acquired for the user terminal 200B, and a route on which the vehicle 300C, which is the closest to the user terminal 200C, is to be shared is acquired for the user terminal 200C.

Figure 19:
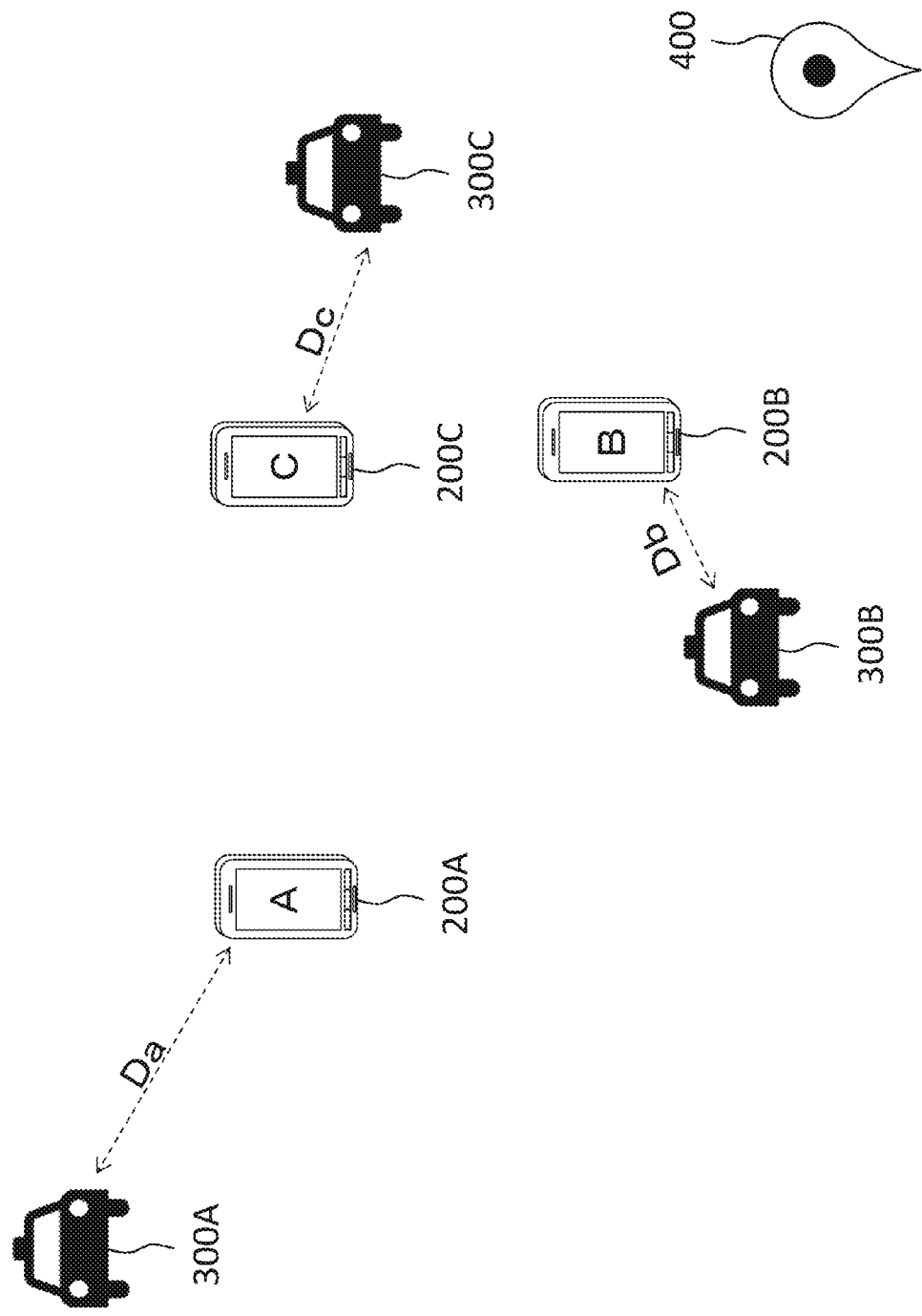
FIG. 19 is a diagram illustrating one example of the route acquiring method of the route acquiring unit of the assisting server used in the vehicle sharing assisting apparatus according to an example embodiment.

While, in the explanation of FIG. 19, a method in which the route acquiring unit 303 acquires a route for vehicle sharing by utilizing vehicles which are closest to the respective plurality of user terminals has been described, the method is not limited to this example. For example, the route acquiring unit 303 may acquire routes for the plurality of vehicles located close to each of the plurality of user terminals. More specifically, the route acquiring unit 303 may acquire a plurality of routes, for example, a route 1 on which the vehicle 300A is to be shared, and a route 2 on which the vehicle 300B which is farther from the user terminal 200A than the vehicle 300A is to be shared for the user terminal 200A. Further, the route acquiring unit 303 may calculate a travel distance of the acquired route, and expected time of arrival calculated from the route and the traffic congestion information.

A list of the list display unit 306 of the assisting server 110 illustrated in FIG. 18 will be described in detail using FIG. 20. FIG. 20 is a diagram illustrating one example of the list displayed by the list display unit of the assisting server used in the vehicle sharing assisting apparatus according to an example embodiment. As illustrated in FIG. 20, items of the list 600 include a vehicle 601, a user 602, a distance 603 to the user, a travel distance 604 and expected time of arrival 605. In the list 600, an example where the list display unit 306 displays a list in an ascending order of the distance to the user based on the distances to the user is illustrated.

Here, the items of the list 600 are not limited to the items illustrated in FIG. 20 and can include other items. Further, the list display unit 306 may display a list in an ascending order of the travel distance based on the travel distance. Further, the list display unit 306 may display a list in chronological order of the expected time of arrival based on the expected time of arrival. The user terminal 200 can select and switch an item to which priority is to be given in the displayed list.

As illustrated in FIG. 19 and FIG. 20, a vehicle, which is the closest from any of the plurality of user terminals, is the vehicle 300B located close to the user terminal 200B. Meanwhile, in the case of the positional relation illustrated in FIG. 19, a route on which the vehicle 300A is to be shared is a route with the shortest travel distance although the vehicle 300A is far from the user terminal 200A. Meanwhile, as illustrated in FIG. 20, if the expected time of arrival which is calculated while reflecting the traffic congestion information is taken into account, a route on which the vehicle 300C is to be shared is a route with the earliest expected time of arrival.

As described above, according to the vehicle sharing assisting apparatus 20, it is possible to provide equivalent advantages to those of the vehicle sharing assisting apparatus 10. Further, because the plurality of routes are acquired and a list of the routes can be displayed according to requests from the user, it is possible to select a route which suits the needs of the user.

Another example embodiment of a vehicle sharing assisting apparatus and a vehicle sharing assisting apparatus including computer readable instructions and/or programs for assisting vehicle sharing according to an example embodiment will be described in detail with reference to FIG. 21 to FIG. 24. It should be noted that because the overview of the vehicle sharing assisting apparatus, the hardware structure of the assisting server, the hardware structure of the user terminal, and the hardware structure of the vehicle are the same or substantially the same as those of the vehicle sharing assisting apparatus 10, the explanation thereof will be omitted.

Figure 21:
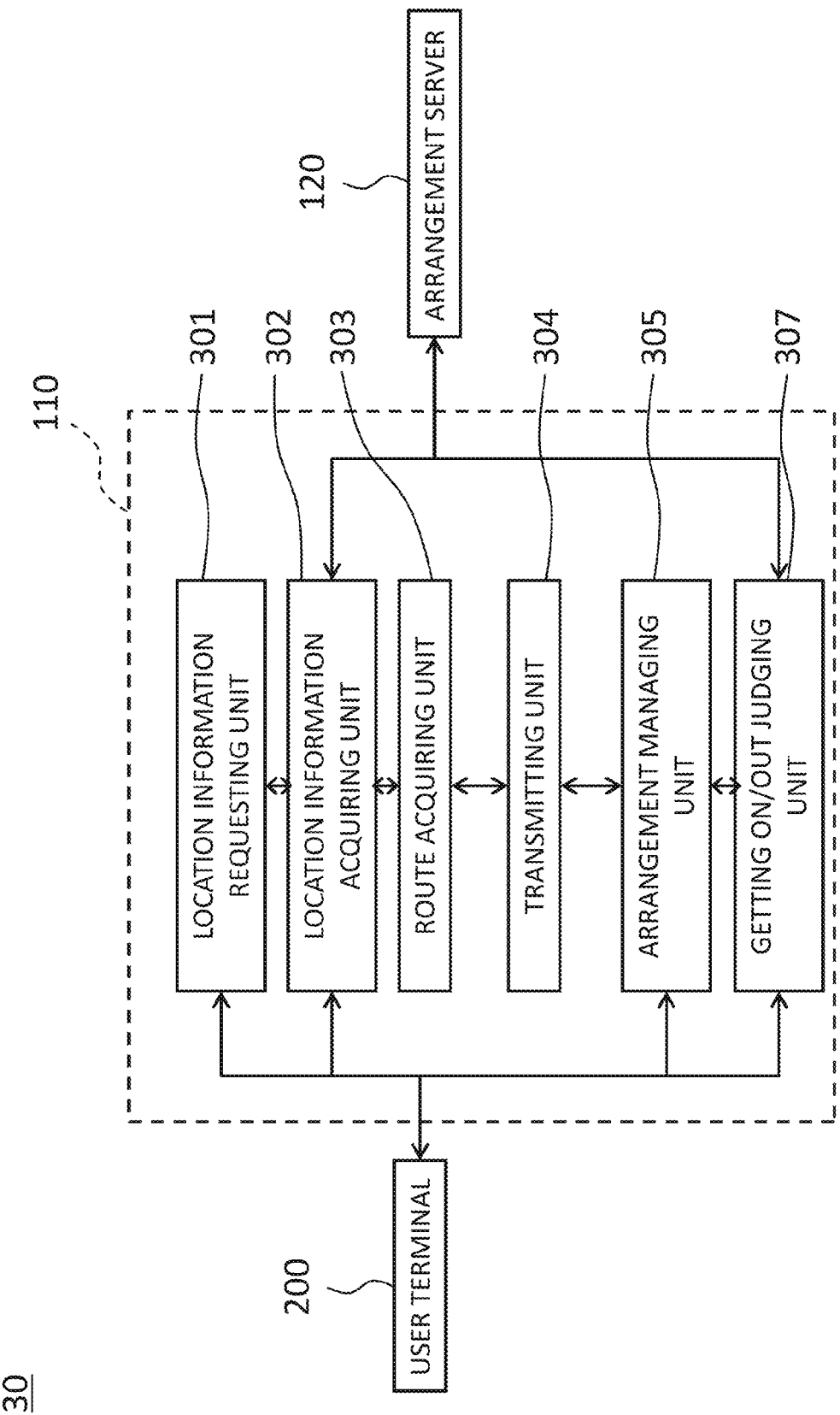
FIG. 21 is a functional block diagram illustrating a configuration of the assisting server used in the vehicle sharing assisting apparatus according to an example embodiment.

FIG. 21 is a functional block diagram illustrating a configuration of the assisting server used in the vehicle sharing assisting apparatus according to an example embodiment. As illustrated in FIG. 21, the assisting server 110 of the vehicle sharing assisting apparatus 30 has a location information requesting unit 301, a location information acquiring unit 302, a route acquiring unit 303, a transmitting unit 304, an arrangement managing unit 305 and a getting on/out judging unit 307. Here, because the location information requesting unit 301, the location information acquiring unit 302, the route acquiring unit 303, the transmitting unit 304, and the arrangement managing unit 305, are the same or substantially the same as those of the vehicle sharing assisting apparatus 10, the explanation thereof will be omitted.

Figure 22:
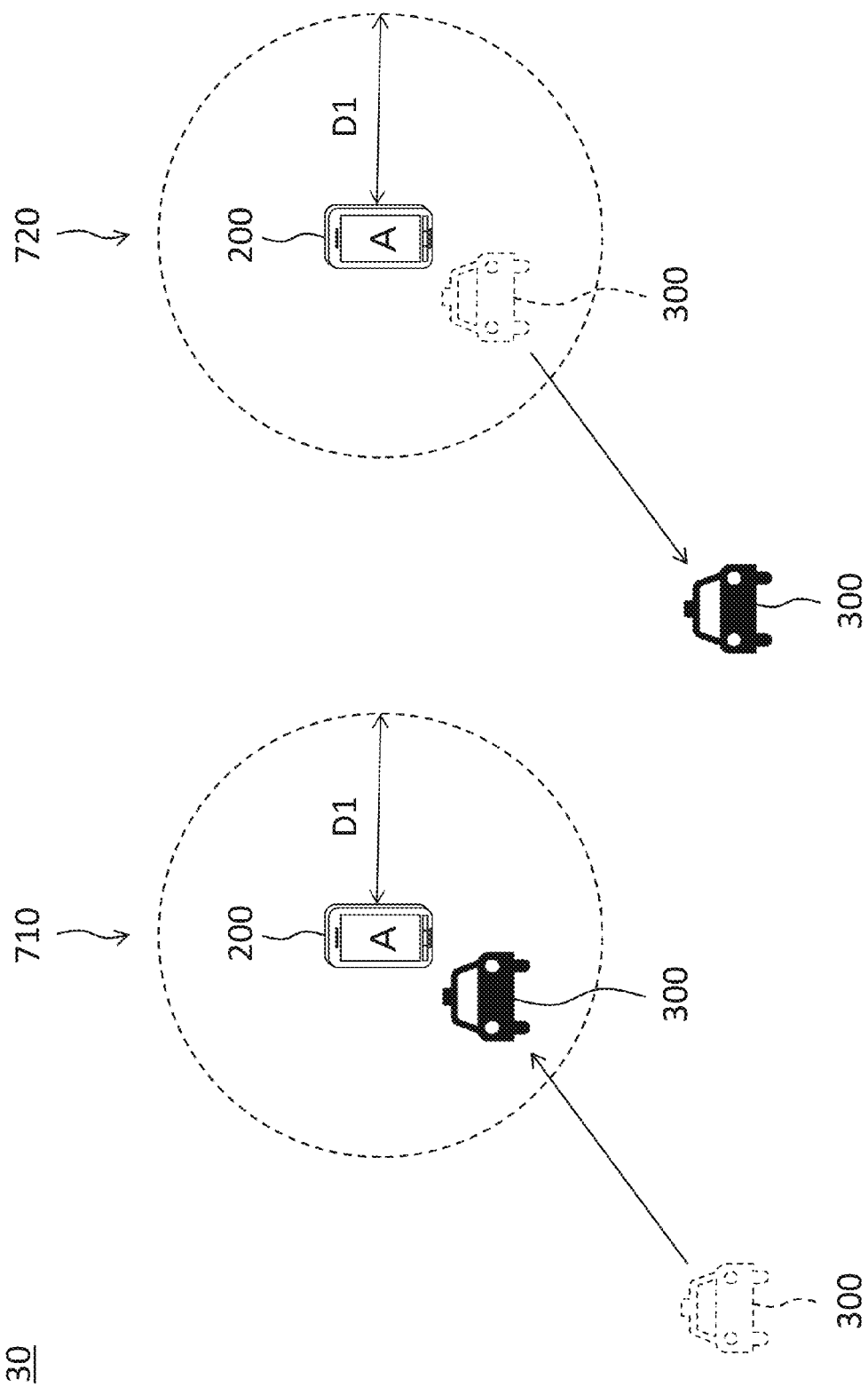
FIG. 22 is a diagram illustrating an example of a getting on/out judging method of a getting on/out judging unit of the assisting server used in the vehicle sharing assisting apparatus according to an example embodiment.

Here, functions of the getting on/out judging unit 307 will be described in detail using FIG. 22. FIG. 22 is a diagram illustrating an example embodiment of the getting on/out judging method of the getting on/out judging unit of the assisting server used in the vehicle sharing assisting apparatus. As illustrated in FIG. 22, the getting on/out judging unit 307 judges that the user terminal has gotten on the vehicle when a distance between the first location information (user terminal) and the second location information (vehicle) is less than or equal to a first distance D1. Meanwhile, the getting on/out judging unit 307 judges that the user has gotten out of the vehicle when the distance between the first location information and the second location information becomes greater than the first distance D1.

Specifically, as in the case of judging getting-on 710 illustrated in FIG. 22, when the vehicle 300 enters within a radius of the first distance D1 from the user terminal 200, it is judged that the user terminal 200 has gotten on the vehicle 300. Further, as in the case of judging getting-out 720, when the vehicle 300 gets out of the radius of the first distance D1 from the user terminal 200, it is judged that the user terminal 200 has gotten out of the vehicle 300.

Further, the transmitting unit 304 may transmit information that the user terminal 200 has gotten on the vehicle 300 or the user terminal 200 has gotten out of the vehicle 300 to the plurality of user terminals 200 which desire to share the vehicle.

Figure 23:
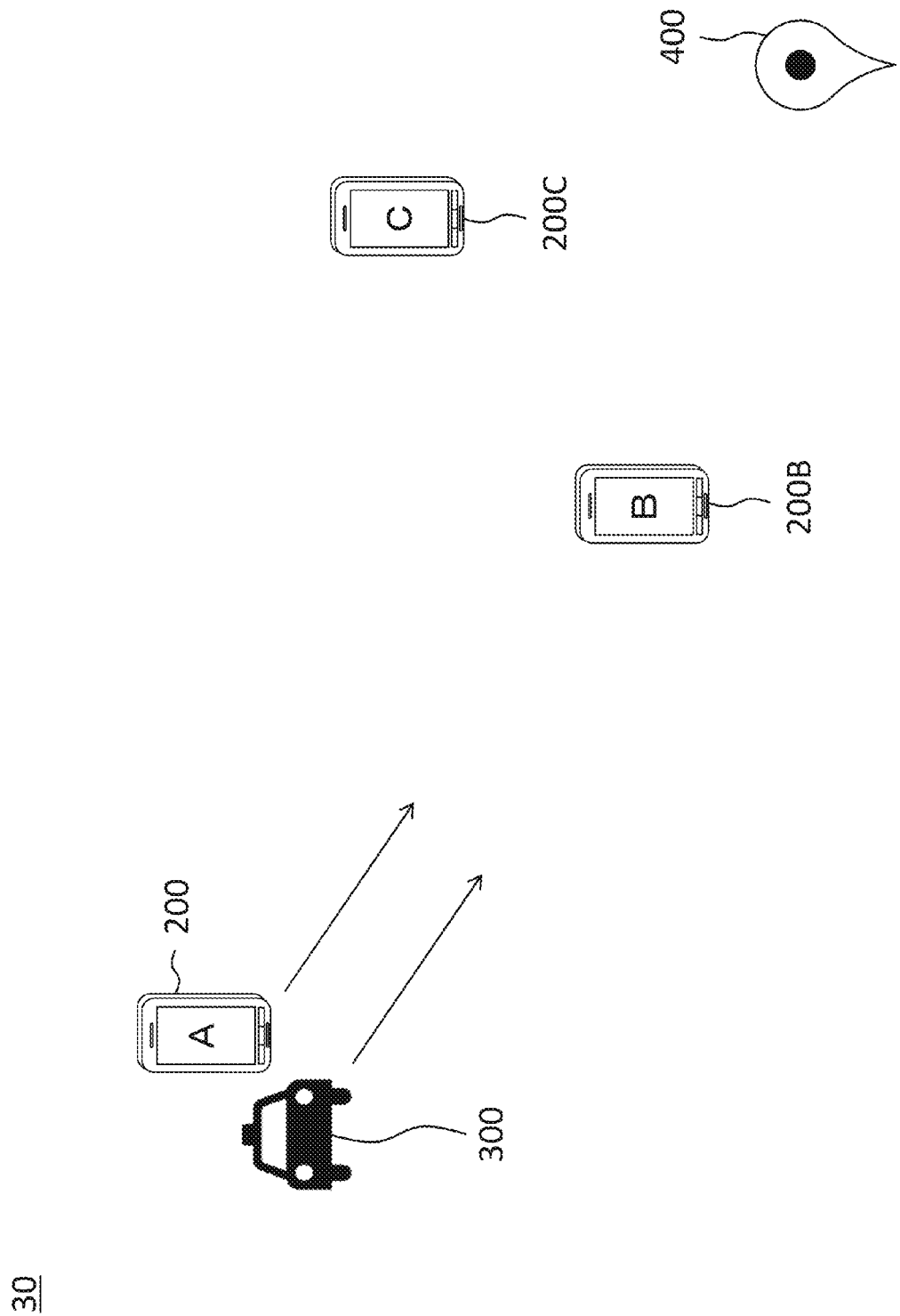
FIG. 23 is a diagram illustrating one example of a getting-on judging method of a getting on/out judging unit of an assisting server used in a vehicle sharing assisting apparatus according to another example embodiment.
Figure 24:
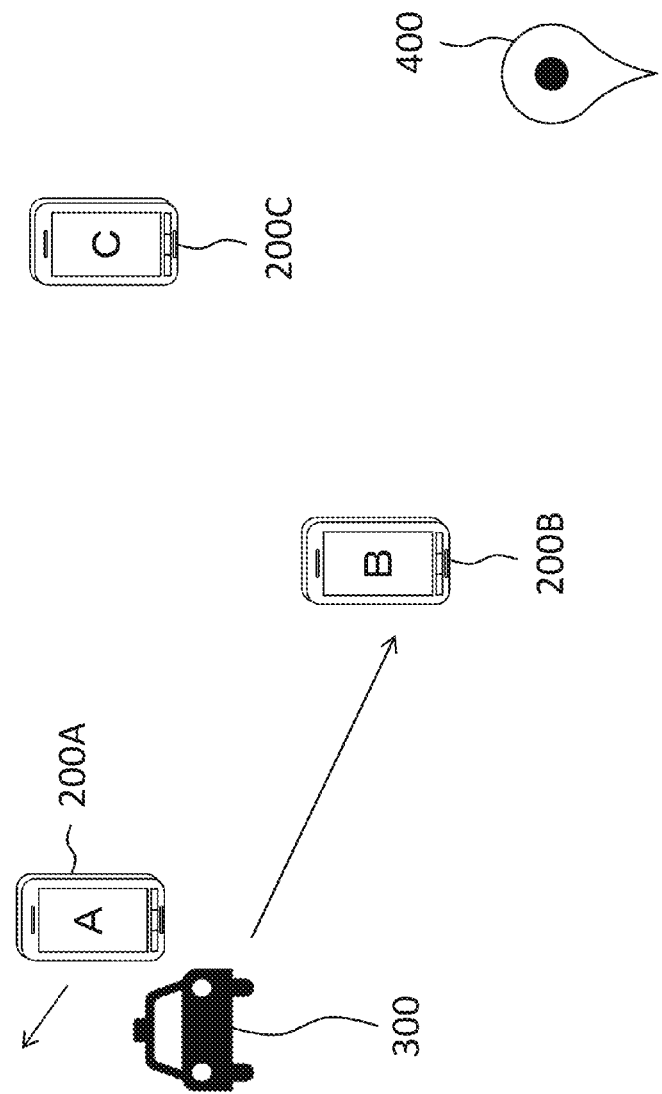
FIG. 24 is a diagram illustrating one example of a getting-out judging method of a getting on/out judging unit of the assisting server used in the vehicle sharing assisting apparatus according to an example embodiment.

A function for further improving accuracy of judging getting on/out will be described next. FIG. 23 is a diagram illustrating another example embodiment of the getting on/out judging method of the getting on/out judging unit of the assisting server used in the vehicle sharing assisting apparatus. As illustrated in FIG. 23, the getting on/out judging unit 307 may judge that the user terminal has gotten on the vehicle when the distance between the first location information (user terminal) and the second location information (vehicle) is less than or equal to the first distance D1 and the first location information and the second location information travel in the same or substantially the same direction. Meanwhile, as illustrated in FIG. 24, the getting on/out judging unit 307 may judge that the user terminal has gotten out of the vehicle when the second location information travels in a different direction from the first location information.

As described above, according to the vehicle sharing assisting apparatus 30, it is possible to provide equivalent advantages to those of the vehicle sharing assisting apparatus 10 and/or 20. Further, because it is possible to obtain getting on/out information of other users who share the vehicle, it is possible to further improve user-friendliness.

Figure 25:
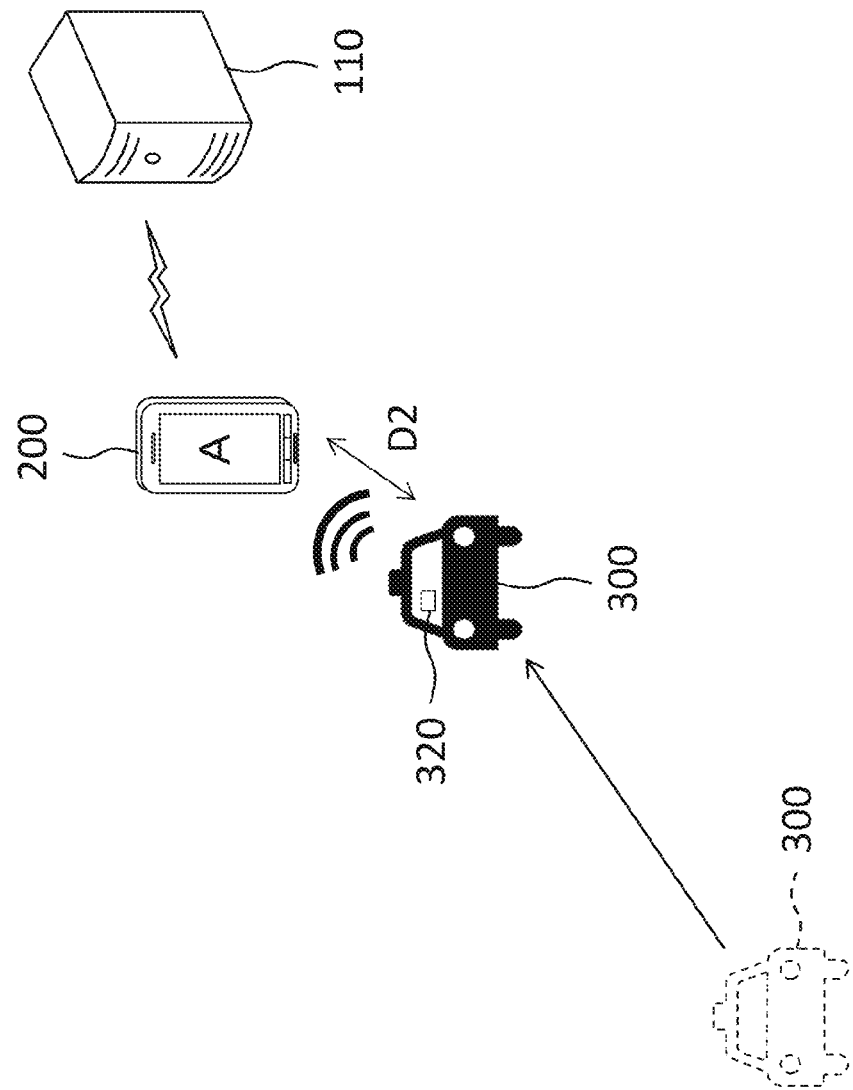
FIG. 25 is a diagram illustrating one example of a getting on/out judging method of the getting on/out judging unit of the assisting server used in the vehicle sharing assisting apparatus according to an example embodiment.

Another example embodiment will be described with regard to FIG. 25 and FIG. 26. FIG. 25 is a diagram illustrating an example embodiment of the getting on/out judging method of the getting on/out judging unit of the assisting server used in the vehicle sharing assisting apparatus. In the vehicle sharing assisting apparatus 31 according to the example embodiment shown in FIG. 25, the vehicle 300 has a near field communication unit 320 which generates a signal when the distance between the user terminal 200 and the vehicle 300 becomes less than or equal to a second distance D2. When the vehicle 300 has the near field communication unit 320, the near field communication unit 320 may be provided at a POS terminal (Point-Of-Sale terminal) provided at the vehicle 300 or a communication terminal of the driver.

The near field communication unit 320 transmits an information signal specific to the near field communication unit 320 to the user terminal 200 when the distance between the user terminal 200 and the vehicle 300 is less than or equal to the second distance D2. That is, for example, the user terminal 200 receives the information signal specific to the near field communication unit 320 from the near field communication unit 320 when the distance between the user terminal 200 and the vehicle 300 becomes a relatively short distance less than or equal to the second distance D2. When the user terminal 200 receives the information signal, the user terminal 200 transmits receipt of the information signal to the assisting server 110. The getting on/out judging unit 307 of the assisting server 110 judges that the user terminal 200 has gotten on the vehicle 300 or the user terminal 200 has gotten out of the vehicle 300 based on the information signal.

Figure 26:
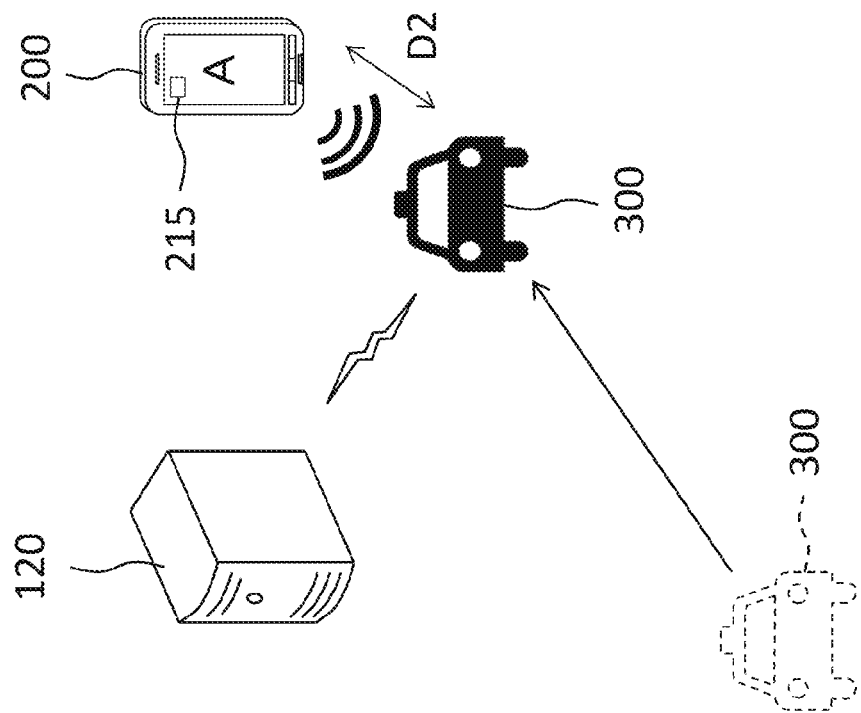
FIG. 26 is a diagram illustrating an example of the getting on/out judging method of the getting on/out judging unit of the assisting server used in the vehicle sharing assisting apparatus according to an example embodiment.

FIG. 26 is a diagram illustrating another example embodiment of the getting on/out judging method of the getting on/out judging unit of the assisting server used in the vehicle sharing assisting apparatus. In the vehicle sharing assisting apparatus 32 according to the example embodiment illustrated in FIG. 26, the user terminal 200 has a near field communication unit 215, which generates a signal when the distance between the user terminal 200 and the vehicle 300 is less than or equal to the second distance D2.

The near field communication unit 215 transmits an information signal specific to the near field communication unit 215 to the vehicle 300 when the distance between the user terminal 200 and the vehicle 300 becomes less than or equal to the second distance D2. That is, for example, when the distance between the user terminal 200 and the vehicle 300 becomes a relatively short distance less than or equal to the second distance D2, the vehicle 300 receives the information signal specific to the near field communication unit 215 from the near field communication unit 215. When the vehicle 300 receives the information signal, the vehicle 300 transmits receipt of the information signal to the arrangement server 120. When the information signal is transmitted from the arrangement server 120 to the assisting server 110, the getting on/out judging unit 307 of the assisting server 110 judges that the user terminal 200 has gotten on the vehicle 300 or the user terminal 200 has gotten out of the vehicle 300 based on the information signal.

As described above, according to the vehicle sharing assisting apparatuses 31 and 32, it is possible to provide equivalent advantages to those of the vehicle sharing assisting apparatus 10, 20 and/or 30. Further, because it is possible to obtain getting on/out information of other users who share the vehicle, it is possible to further improve user-friendliness.

It should be noted that example embodiments are not limited to those described herein, but can be modified as appropriate without departing from the scope of this disclosure.

What is claimed is:

1. An apparatus comprising:
at least one processor configured to execute computer readable instructions to
acquire first location information, second location information, and third location information, the first location information representing locations of a plurality of user terminals, the second location information representing a location of at least one vehicle, and the third location information representing a location of a destination of the plurality of user terminals, and
determine a route from the location of the at least one vehicle to the location of the destination based on the first location information, the second location information and the third location information, the route including the locations of the plurality of user terminals; and
a transceiver configured to transmit the route to the plurality of user terminals; wherein
the transceiver is further configured to transmit information indicating that the at least one vehicle is approaching a first of the plurality of user terminals when a distance between the location of the at least one vehicle and a location of the first of the plurality of user terminals is less than or equal to a first threshold distance, and
the at least one processor is further configured to execute the computer readable instructions to determine that the first of the plurality of user terminals has entered the at least one vehicle when a distance between the location of the first of the plurality of user terminals and the location of the at least one vehicle is less than or equal to a second threshold distance.

2. The apparatus according to claim 1, wherein the at least one processor is further configured to execute the computer readable instructions to determine that the first of the plurality of user terminals has entered the at least one vehicle when the location of the first of the plurality of user terminals and the location of the at least one vehicle move in the same direction.

3. The apparatus according to claim 1, wherein the at least one processor is further configured to execute the computer readable instructions to determine that the first of the plurality of user terminals has exited the vehicle when the distance between the location of the first of the plurality of user terminals and the location of the at least one vehicle exceeds the second threshold distance.

4. The apparatus according to claim 1, wherein the at least one processor is further configured to execute the computer readable instructions to determine that the first of the plurality of user terminals has exited the at least one vehicle when the location of the at least one vehicle and the location of the first of the plurality of user terminals indicates that the at least one vehicle is moving in a different direction relative to the first of the plurality of user terminals.

5. The apparatus according to claim 1, wherein
at least one of the first of the plurality of user terminals and the at least one vehicle includes a near field communication transceiver, the near field communication transceiver being configured to generate a signal when a distance between the first of the plurality of user terminals and the at least one vehicle is less than or equal to the second threshold distance; and
the at least one processor is further configured to execute the computer readable instructions to determine that the first of the plurality of user terminals has entered or exited the at least one vehicle based on the signal.

6. A non-transitory computer readable medium storing computer readable instructions that, when executed by at least one processor, cause a computer to perform a method comprising:
acquiring first location information, second location information, and third location information in response to a request to share a vehicle among a plurality of users, each of the plurality of users corresponding to a user terminal among a plurality of user terminals, the first location information representing locations of the plurality of user terminals, the second location information representing a location of the vehicle, and the third location information representing a location of a destination of the plurality of user terminals;
determining a route from the location of the vehicle to the location of the destination based on the first location information, the second location information and the third location information, the route including the locations of the plurality of user terminals;
transmitting the route to the plurality of user terminals;
transmitting information indicating that the vehicle is approaching a first of the plurality of user terminals when a distance between the location of the vehicle and a location of the first of the plurality of user terminals is less than or equal to a first threshold distance; and
determining that the first of the plurality of user terminals has entered the vehicle when a distance between the location of the first of the plurality of user terminals and the location of the vehicle is less than or equal to a second threshold distance.

7. A method comprising:
acquiring first location information, second location information, and third location information in response to a request to share a vehicle among a plurality of users, each of the plurality of users corresponding to a user terminal among a plurality of user terminals, the first location information representing locations of the plurality of user terminals, the second location information representing a location of the vehicle, and the third location information representing a location of a destination of the plurality of user terminals;
determining a route from the location of the vehicle to the location of the destination based on the first location information, the second location information and the third location information, the route including the locations of the plurality of user terminals;

transmitting the route to the plurality of user terminals;

transmitting information indicating that the vehicle is approaching a first of the plurality of user terminals when a distance between the location of the vehicle and a location of the first of the plurality of user terminals is less than or equal to a first threshold distance; and determining that the first of the plurality of user terminals has entered the vehicle when a distance between the location of the first of the plurality of user terminals and the location of the vehicle is less than or equal to a second threshold distance.

\* \* \* \* \*